United States Patent

Sawada et al.

Patent Number: 6,064,931
Date of Patent: May 16, 2000

[54] CONTROL APPARATUS FOR VEHICLE

[75] Inventors: Mamoru Sawada, Yokkaichi; Nobuyoshi Onogi, Nagoya, both of Japan

[73] Assignee: DENSO Corporation, Kariya, Japan

[21] Appl. No.: 09/343,678

[22] Filed: Jun. 30, 1999

Related U.S. Application Data

[63] Continuation of application No. PCT/JP98/05283, Nov. 24, 1998.

[30] Foreign Application Priority Data

Nov. 28, 1997 [JP] Japan ................................. 9-327591

[51] Int. Cl.⁷ ..................................................... B60J 8/32
[52] U.S. Cl. .............................. 701/41; 73/11; 73/146.5; 73/146.2; 303/191; 364/424.046; 267/140.14; 701/71; 701/79; 701/85
[58] Field of Search ........................ 280/124.101, 5.503, 280/5.519; 188/266.4; 701/37, 70, 41, 71, 79, 85; 73/146.5, 11, 146.2; 364/424.046; 267/140.14; 303/191

[56] References Cited

U.S. PATENT DOCUMENTS

| | | | |
|---|---|---|---|
| 4,002,051 | 1/1977 | Hilbrands | 73/11 |
| 5,193,844 | 3/1993 | Butsuen et al. | 188/266.4 |
| 5,553,491 | 9/1996 | Naito et al. | 73/146.5 |
| 5,740,039 | 4/1998 | Hirahara et al. | 364/423.046 |
| 5,801,305 | 10/1998 | Kawai et al. | 73/146.2 |
| 5,844,475 | 12/1998 | Horie | 340/442 |
| 5,979,885 | 11/1999 | Katsuda | 267/140.14 |
| 5,987,369 | 11/1999 | Kwak et al. | 701/37 |

FOREIGN PATENT DOCUMENTS

| | | |
|---|---|---|
| 52-52079 | 4/1977 | Japan . |
| 61-67652 | 4/1986 | Japan . |
| 1-115760 | 5/1989 | Japan . |
| 4-24154 | 1/1992 | Japan . |
| 5-26917 | 2/1993 | Japan . |
| 5-50914 | 3/1993 | Japan . |
| 7-98325 | 4/1995 | Japan . |
| 7-251751 | 10/1995 | Japan . |
| 8-72514 | 3/1996 | Japan . |
| 9-196791 | 7/1997 | Japan . |

*Primary Examiner*—William A. Cuchlinski, Jr.
*Assistant Examiner*—Ronnie Mancho
*Attorney, Agent, or Firm*—Pillsbury Madison & Sutro LLP

[57] ABSTRACT

A wheel load of each wheel or a vehicle body load is estimated based on a gain of a resonance frequency of a tire, and the estimated wheel load or vehicle body load is applied to a braking control or an acceleration control. Further, a ground contact load of each wheel or the vehicle body load of the vehicle is estimated based on the gain of the resonance frequency extracted from each of the tires for use in a vehicle control.

27 Claims, 13 Drawing Sheets

CONTROL APPARATUS FOR VEHICLE

CROSS REFERENCE TO RELATED APPLICATION

This is a continuation of an international patent application Ser. No. PCT/JP98/05283 designating the United States of America, the contents of which are incorporated herein by reference.

BACKGROUND OF THE INVENTION

1. Field of the Invention

The present invention relates to a control apparatus for a vehicle, which estimates a vehicle body load based on a gain of a resonance frequency of a wheel, and varies a braking or acceleration characteristics in accordance with the estimated vehicle body load.

2. Description of Related Art

As a conventional apparatus for indirectly estimating a tire air pressure, for example, a tire air pressure detecting apparatus is disclosed in JP-A-8-72514. In this apparatus, a resonance frequency of a tire is extracted from a wheel speed signal, noises are eliminated, and a decrease in the tire air pressure is detected based on a change in the resonance frequency. In the apparatus, noises are eliminated in consideration of an influence exerted by a turning of a vehicle. As a method of indirectly estimating a lateral acceleration indicative of a turning state of a vehicle, a method of using a difference between the gains of the resonance frequencies of right and left wheels is disclosed.

SUMMARY OF THE INVENTION

It is an object of the present invention to provide a vehicle control apparatus, in which a wheel load of each wheel or a vehicle body load is estimated based on a fact that a fluctuation in vibration (pitch) synchronized with rotation of a tire or in the gain of the resonance frequency of a tire corresponds to a wheel load of each wheel.

It is another object of the present invention to provide a vehicle control apparatus, in which the estimated wheel load or vehicle body load is applied to a braking control or an acceleration control or the like.

According to one aspect of the present invention, each of resonance frequencies generated in tires of a plurality of wheels is detected when a vehicle travels, a gain of the resonance frequency of each tire is detected, and a vehicle body load of the vehicle is estimated based on the gain of the resonance frequency extracted from each of the tires. Thus, a change in the vehicle body load which varies according to the number of passengers, a loaded weight, and the like can be obtained from the gain of the resonance frequency. In a case where an anti-skid control apparatus or the like is equipped as standard, the vehicle body load can be therefore estimated by a software without additional devices.

According to another aspect of the present invention, a ground contact load of each wheel is estimated based on a gain of the resonance frequency of each tire, and a vehicle body load is estimated based on the ground contact load of each wheel.

According to a further aspect of the present invention, each of wheel speeds of a plurality of wheels is detected when a vehicle travels, a resonance frequency generated in a tire of each wheel is detected based on a wheel speed signal corresponding to each wheel, a gain of the resonance frequency of each tire is detected, a ground contact load ratio of each wheel is estimated based on the gain of the resonance frequency of each tire, and at least one of a braking control, an acceleration control, a power steering control, and a driving force control of a vehicle is executed in accordance with the ground contact load ratio. Since the characteristics of the braking control, the acceleration control, and the like change according to a change in the ground contact load ratio of each wheel, by varying the control according to the change, the stability of the vehicle body, the operability for the driver, reduction in the braking distance, and the like can be realized. Especially, in the braking control, in the case where it is assumed that the road surface state under the wheels is almost even, at least in a region until the slip ratio which reaches the vertex of a $\mu$-S curve characteristics, when a road surface reactive force in each wheel is determined in accordance with the braking force applied to each wheel, that is, the ratio of the wheel cylinder pressure, the ground contact load ratio of each wheel becomes a factor of variation of the road surface reactive force in each wheel. When the ground contact load ratio can be estimated, the braking force control such as uniformization of the road surface reactive forces in the wheels can be realized.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
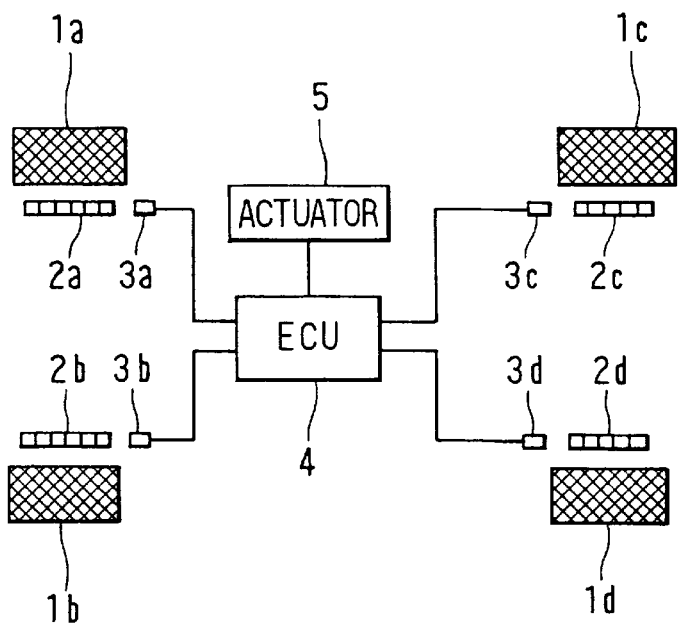
FIG. 1 is a schematic block diagram of a vehicle control apparatus of the invention.

The invention will be described hereinbelow with respect to embodiments shown in the drawings.

(First Embodiment)

Referring to FIG. 1 showing an apparatus for estimating a load of each wheel or a wheel load ratio, wheel speed sensors are mounted in correspondence with four front/rear right/left tires 1a to 1d attached to a vehicle. The wheel speed sensors comprise toothed-gear shaped pulsers 2a to 2d each made of a magnetic member and pickup coils 3a to 3d, respectively. The pulsers 2a to 2d are fixed to rotary shafts (not shown) of the tires 1a to 1d, respectively. The pickup coils 3a to 3d are mounted with predetermined intervals from the pulsers 2a to 2d, respectively, and output alternating current (a.c.) signals having periodicity according to the rotation of the pulsers 2a to 2d, that is, the rotational speeds of the tires 1a to 1d.

The a.c. signals outputted from the pickup coils 3a to 3d are supplied to an ECU (electronic control unit) 4. The ECU 4 is constructed by a CPU, a waveform forming circuit, a ROM, a RAM, and the like and processes supplied various signals in accordance with a predetermined program. The result of the process is supplied to an actuator 5, thereby driving each of actuators which will be described hereinbelow.

The principle of estimation of the load of each wheel or estimation of a ratio of loads of the wheels in the embodiment will be described.

Figure 2:
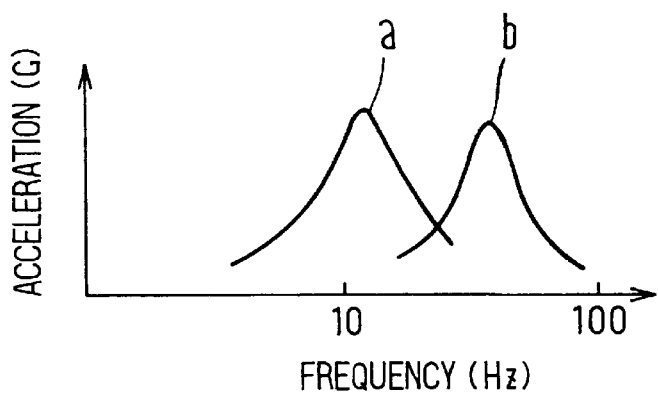
FIG. 2 is a characteristics graph showing a frequency characteristics under the spring of a vehicle.

When a vehicle travels on a paved asphalt road, a force in the up/down, front/rear, or rotational direction is applied to a tire due to fine asperities on the top face of the road and the tire vibrates in the up/down, lateral, or rotational direction by the applied force. In the frequency characteristics of the tire when the tire vibrates, as shown in FIG. 2, peak values are shown by a-point and b-point. The a-point indicates a resonance frequency in the up/down direction of the tire. The b-point indicates a resonance frequency in the front/rear direction under the spring of the vehicle. That is, the resonance vibration occurs in the tire by the resonance between vibration of the tire as an elastic body when the vibration is caused between the road surface and the tire and the natural vibration of the tire spring part, and the frequencies appear at the a-point and b-point as resonance frequencies.

On the other hand, the component of the vibration frequency of the tire is included in the sensor signal of the wheel speed sensor. That is, when the frequency of the sensor signal of the wheel speed sensor is analyzed, the tire resonance frequency can be sensed. Since the wheel speed sensor is generally provided for each wheel in a vehicle mounted with an ABS or a braking assist system, in case of sensing the resonance frequency of the tire, the tire air pressure can be sensed without an additional sensor.

Figure 3:
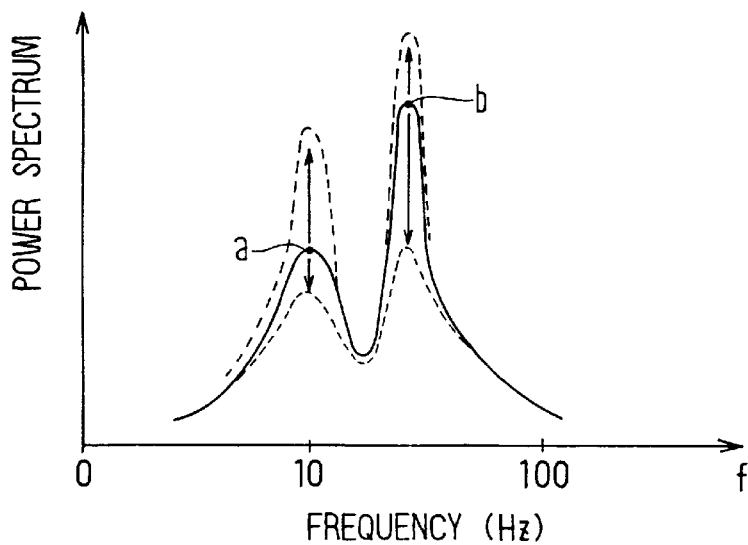
FIG. 3 is a characteristics graph showing the relation between a power spectrum of a resonance frequency and a wheel load.

It is now assumed that the ground contact load of each wheel changes. It can be considered that the change in the ground contact load is caused by a lateral load shift by a turning of a vehicle or a load shift in the front/rear direction when brake is applied in the vehicle. A static load change in a light load or a constant load can be also considered. As shown in FIG. 3, when such a change in the ground contact load occurs, the power spectrum of the resonance frequency changes. More specifically, the power spectrum of the resonance frequency of a wheel on which the ground contact load becomes low decreases and the power spectrum of the resonance frequency of a wheel on which the ground contact load becomes high increases for the following reason. That is, when the ground contact load becomes high, the vibrating force with the road surface increases or elastic energy of the tire spring part increases, so that the power spectrum of the resonance frequency increases. On the contrary, when the ground contact load becomes low, the vibrating force with the road surface decreases and the elastic energy of the tire decreases, so that the power spectrum of the resonance frequency is reduced. The solid line in FIG. 3 indicates, for instance, a ground contact load of the front right and left wheels in a straight-ahead travel state. The upper dotted line in FIG. 3 shows the ground contact load of the front right wheel and the lower dotted line of FIG. 3 shows the ground contact load of the front left wheel, for example, when the vehicle turns left. In FIG. 3, a fourth-order curve having vertexes at about 10 Hz and 70 Hz is shown. The vertex at 10 Hz denotes a primary resonance point in the vibrating force with the road surface of the tire and the vertex around 70 Hz is a secondary resonance point. Although not shown, the resonance points exist in a quadratic or higher-degree high frequency region. The absolute value of the magnitude of the power spectrum (amplitude) in FIG. 3 changes according to a state of the driving road such as an asphalt road, a dirt road, or a concrete road. That is, the vibrating force applied to the tire differs according to the degree of asperities existing on the road surface. It is assumed that FIG. 3 shows a case where the vehicle travels on the asphalt road.

Referring to the flow diagram of FIG. 4, the main control processing of the embodiment will be described. The ECU 4 repetitively executes a similar process to each of the wheels every fixed reference time interval.

Figure 5:
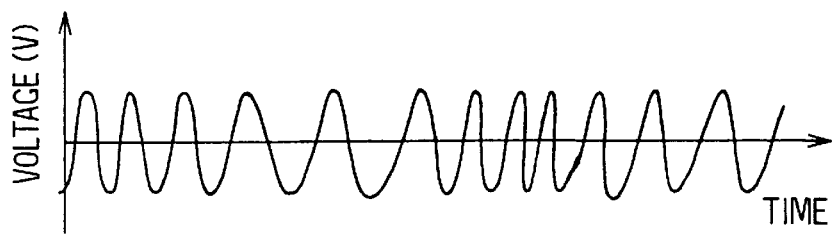
FIG. 5 is a waveform diagram showing an output voltage waveform of a wheel speed sensor.
Figure 6:
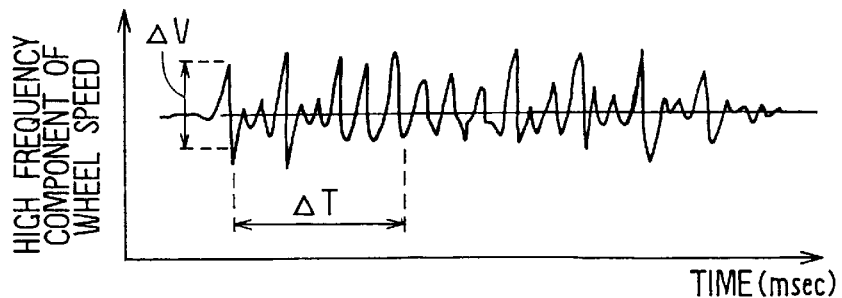
FIG. 6 is a waveform diagram showing a fluctuation state of a wheel speed V calculated based on a sensor signal of the wheel speed sensor.

When a signal processing by the ECU 4 is started in association with turn-on of an ignition switch (not shown), at step 100, the waveform of the a.c. signal (refer to FIG. 5) outputted from each of the pickup coils 3 (3a to 3d) is shaped to thereby generate a pulse signal. After that, the pulse interval is divided by a predetermined time, thereby calculating a wheel speed VW. Here,  indicates each wheel. The front right wheel, front left wheel, rear right wheel, and rear left wheel are expressed by FR, FL, RR, and RL, respectively. In the following description, the indication of ** is omitted. The wheel speed VW usually includes, as shown in FIG. 6, many high frequency components including the vibration frequency component of the tire. At step 110, a road surface state determining process for determining whether the range of fluctuation ΔV of the calculated wheel speed VW is equal to or larger than a reference value V0 or not is performed. When the fluctuation range ΔV of the wheel speed VW is determined to be equal to or larger than the reference value V0, the routine advances to step 120.

At step 120, a road surface length determining process for determining time ΔT during which the fluctuation range ΔV of the wheel speed VW is equal to or larger than the reference value V0 is equal to or longer than a predetermined time t0 is carried out. The road surface length determining process is performed in order to determine whether or not the ground contact load of each wheel or the ground contact load ratio can be accurately detected by a detecting method of the embodiment, or whether or not the resonance frequency of the tire of each wheel or the change in the power spectrum of the resonance frequency can be accurately detected with the road surface on which the vehicle travels.

More specifically, in the embodiment, the ground contact load of each wheel or the ground contact load ratio is detected based on an individual change or a relative change in the power spectrum of the resonance frequency of the tire of each wheel. Consequently, unless the wheel speed VW fluctuates to a certain degree and its fluctuation continues, sufficient data to accurately calculate the resonance frequency or a change in the power spectrum of the resonance frequency cannot be obtained. In the determination of step 120, a predetermined time Δt is set at a time point when the fluctuation range ΔV of the wheel speed VW becomes equal to or larger than the reference value V0. When the fluctuation range ΔV of the wheel speed VW becomes V0 or larger again within the predetermined time Δt, the counting of the time ΔT is continued.

When NO at either step 110 or step 120, the process is finished and the routine is returned to step 100. When YES at both of the steps 110 and 120, the routine advances to step 130 where the wheel speed VW is subjected to frequency analysis by FFT (fast Fourier transform) operation. At step 140, from the result of the FFT operation calculated at step 130, data to be used for subsequent processing is selected.

It can be considered that the condition of not adopting the FFT result is that, for example, a vibration level (that is, noise components) except for a vibration level of the tire resonance related to the spring constant of the tire as a rubber part of the wheel is higher than a predetermined value. In such a case, there is the possibility that a tire resonance phenomenon is not accurately detected in the FFT operation result. Consequently, the FFT operation result is not adopted.

Figure 7:
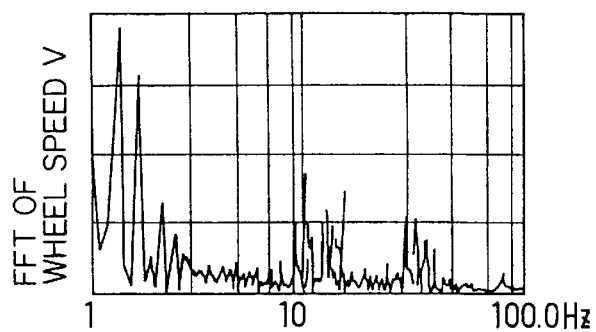
FIG. 7 is a characteristics graph showing an FFT operation result with the time waveform of the wheel speed V.
Figure 8:
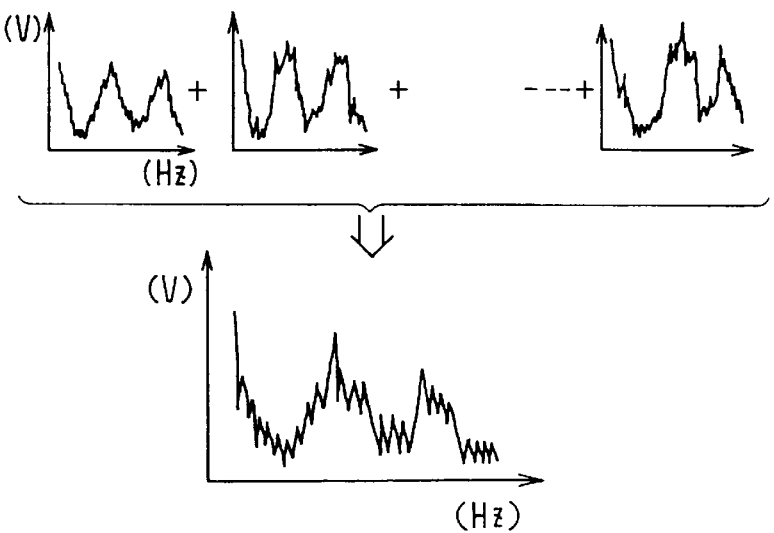
FIG. 8 is an explanatory diagram showing an averaging process.

At step 150, the number of FFT operations is integrated. In the case where the wheel speed obtained when the vehicle actually drives on a normal road is subjected to the FFT operation, as shown in FIG. 7, a very random frequency characteristics is usually obtained. This is because that the shapes (sizes and heights) of fine bumps and dips existing on the road surface are quite irregular. The frequency characteristics fluctuates in one wheel speed data to another. In order to reduce the fluctuation of the frequency characteristics as much as possible in the embodiment, therefore, an average value of FFT operation results of a plurality of times is obtained. For this purpose, at step 160, whether the number N of operation times of FFT reaches a predetermined number N0 or not is determined. When the number N of operation times does not reach the predetermined number N0, processes of steps 100 to 150 are repeated. When the number N of operation times reaches the predetermined number N0, the averaging process is executed in the following step 180. As shown in FIG. 8, the averaging process is executed to obtain the average value of the FFT operation results and the average value of gains of frequency components is calculated. The fluctuation in the FFT operation results according to the road surface can be reduced by the averaging process.

There is, however, a problem such that the resonance frequency gain in the up/down, front/rear, or rotational direction of the tire according to the spring constant of a tire rubber part does not always become the maximum peak value as compared with the gains of frequencies around the resonance frequency only by the averaging process due to noises and the like. Following the averaging process, a moving averaging process is executed at step 180. The moving averaging process is performed by obtaining the gain $Y_n$ of the (n)th frequency by the following arithmetic expression.

$$Y_n = (y_{n+1} + Y_{n-1})/2 \qquad (1)$$

Figure 9:
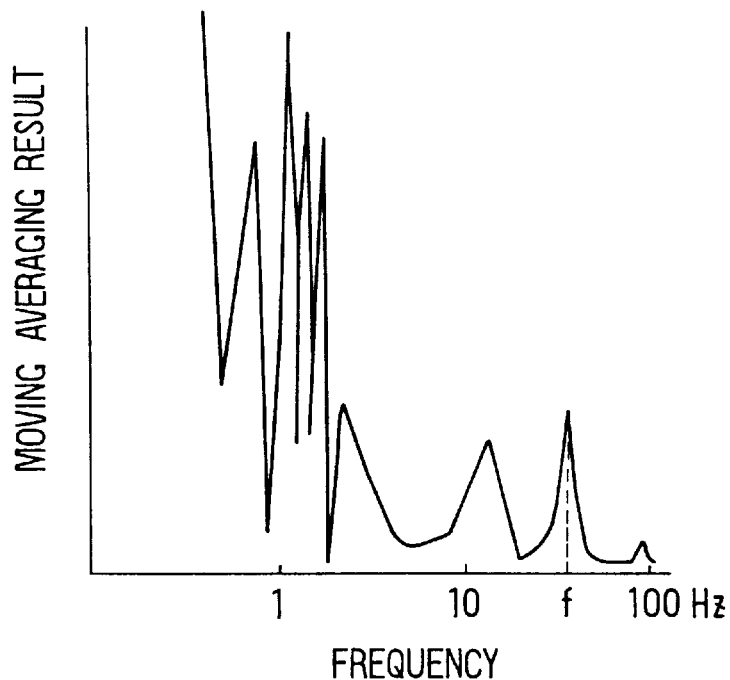
FIG. 9 is a characteristics graph showing an FFT operation result after execution of a moving averaging process.

That is, in the moving averaging process, the gain $Y_n$ of the (n)th frequency is set to an average value of the (n+1)th gain $y_{n+1}$ in the previous operation result and the gain $Y_{n-1}$ of the (n−1)th frequency which has been already calculated. By the operation, the FFT results show a waveform which smoothly changes. FIG. 9 shows the calculation results obtained by the moving averaging process.

The waveform process is not limited to the moving averaging process. Before execution of the FFT operation at step 130, a differential operation of the wheel speed VW may be executed and the differential operation result may be subjected to the FFT operation.

In the following step 190, by using the FFT operation results smoothed by the moving averaging process, a resonance frequency fk related to the spring constant of the rubber part of a tire is calculated. At step 200, a deviation (fk0−fk) due to reduction between an initial resonance frequency fk0 which is preliminarily set in correspondence with a normal tire air pressure and the resonance frequency fk which is sequentially calculated is obtained. At step 210, an abnormality of the tire air pressure is checked. For example, the deviation due to reduction is compared with a determination deviation Δf(=fk0−f1) between fk0 and a resonance frequency f1 corresponding to a tire air pressure reduction alarm pressure (for example, 1.4 kg/cm²). When (fk0−fk)<Δf, it is determined that there is no tire air pressure reduction large enough to exert an influence on the estimation of the ground contact load or the accuracy of the estimation of the ground contact load ratio, and the routine advances to step 220. When (fk0−fk)¢Δf, the routine is returned. In this case, an alarm of the air pressure reduction can be notified to the driver.

At step 220, a power spectrum Gfk of the resonance frequency of the tire of the wheel as a target of the present control is calculated. The power spectrum Gfk is calculated as a value corresponding to the ground contact load of each wheel.

Figure 10:
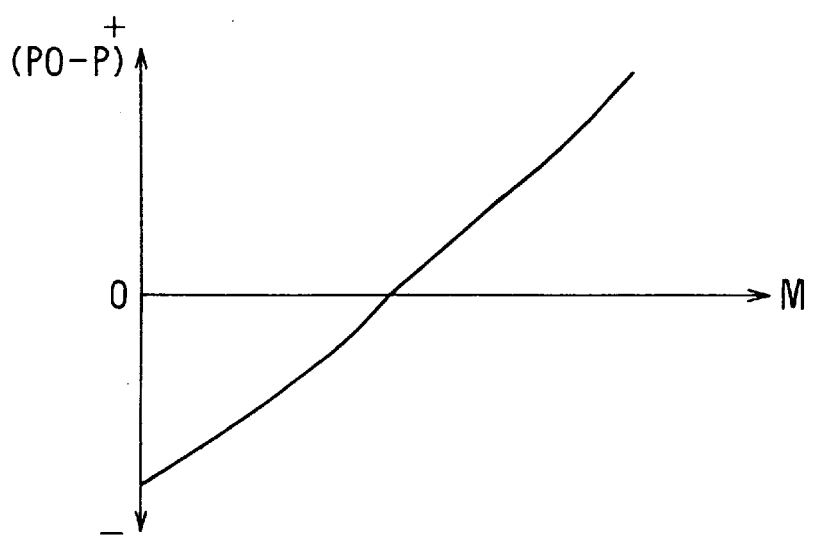
FIG. 10 is a map which is used to estimate a ground contact load of a wheel as a target to be controlled.

At step 230, a ground contact load M of the wheel as a target of the control is estimated based on the power spectrum of the resonance frequency. For example, a standard power spectrum P0 of a resonance frequency at the time of a standard ground contact load M0 when the vehicle which does not have anything such as a driver or a load is used as a reference is preliminarily stored, a difference between the standard power spectrum P0 and the power spectrum P calculated at step 230 is calculated, and the ground contact load M of a wheel as a control target at present is estimated by using the relation map of the difference (P0–P) and the ground contact load (refer to FIG. 10).

In this case, means for detecting a state of a driving road surface (asphalt road or dirt road) is provided. The road surface is selected and the estimation may be permitted so as to estimate the ground contact load at the time of travel only on the asphalt road as a reference. Not the estimation permission, but a permission of whether or not the estimation result is adopted in a post control such as a braking control or a steering control may be also given according to the road surface. When it is detected that the vehicle travels on a dirt road, the power spectrum Gfk larger than that in case of the asphalt road is often generated. Consequently, the ground contact load can be estimated by multiplying the value of the power spectrum Gfk in the case of the dirt road with a predetermined value such as, for example, 0.75. Whether the vehicle travels on the asphalt road or the dirt road can be determined by a known technique. For instance, it can be estimated based on the fluctuation component (differential value) of the wheel acceleration.

Based on the ground contact load of each wheel estimated at step 230, a vehicle control is executed in the subsequent steps.

More specifically, a braking control at step 240, an acceleration control at step 250, a power steering control at step 260, and a driving force control (control to distribute the driving force generated by an engine output to the wheels) at step 270 are performed.

The details of each of the steps 240 to 270 will be described hereinbelow.

[Braking control (step 240)]

Figure 11:
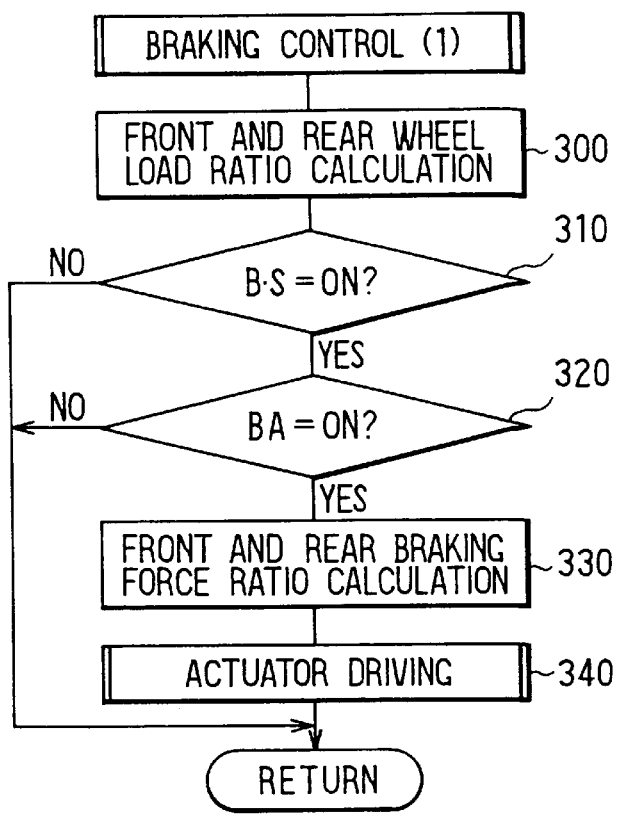
FIG. 11 is a flow diagram showing a first example of a braking control.

(1) FIG. 11 shows the first example of the braking control executed at step 240 and the braking control will be explained with reference to the figure.

At step 300, the ratio between the wheel ground contact load on the front wheel side and the wheel ground contact load on the rear wheel side is calculated based on the ground contact loads of the wheels estimated at step 230. As the ground contact load ratio of the front and rear wheels, it is sufficient to use the ratio between the average value of the ground contact loads of the right and left front wheels and the average value of the ground contact loads of the right and left rear wheels. As the ratio of the ground contact loads of the front and rear wheels, the ratio between the sum of the ground contact loads of the front right and left wheels and the sum of the ground contact loads of the rear right and left wheels can be also used.

Since the ground contact load of the wheel changes according to the kind of the road surface on which a vehicle travels, the control performed to the wheel ground contact load ratio can be also changed according to the kind of the road surface. That is, the load applied from the road surface of each wheel is higher on the rough road surface as compared with a flat road surface and the ratio of the wheel ground contact loads fluctuates, so that each control may be changed according to the fluctuation.

Figure 12:
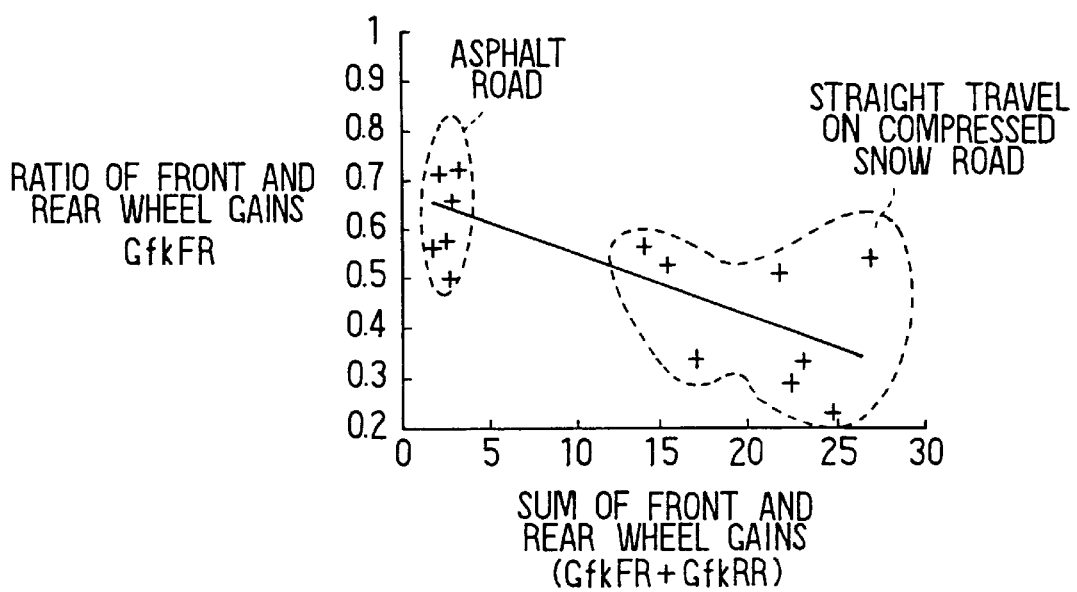
FIG. 12 is a graph showing the ratio of wheel gains according to the kind of a road surface of the first example of the braking control.

More specifically, since the sum of the front and rear wheel gains changes according to the kind of the road surface, the ratio of the front and rear wheel gains according to the sum of the front and rear wheel gains is obtained and mapped. The control to the wheel ground contact load ratio is changed based on the map. FIG. 12 shows an example of the map formed. As shown in the diagram, the sum of the front and rear wheel gains becomes smaller on a flat road surface such as an asphalt road surface. The sum of the front and rear wheel gains increases on a rough road surface such as a compressed snow road. Consequently, it is sufficient to determine the kind of the road surface by the sum of the front and rear wheel gains and start each control when the ratio of the front and rear wheel gains becomes equal to or larger than a predetermined value in the case of using the sum of the front and rear wheel gains. The straight line shown in the graph indicates an example of a threshold of a control start according to the sum of the front and rear wheel gains.

Although the example of obtaining the wheel ground contact load ratio from the ground contact loads of the wheels has been described above, the following method can be also used. The value of the power spectrum Gfk of each wheel or a value obtained by processing the value of the power spectrum Gfk is set to a value corresponding to the ground contact load of each wheel. Irrespective of the true value of the ground contact load of each wheel, the ground contact load ratio of each wheel is obtained by using the value corresponding to the ground contact load of each wheel.

At step 310, whether or not a brake switch responsive to a brake pedal operation by the driver is ON is determined to check whether a vehicle is substantially in a braked state by a brake fluid pressure or not. The brake switch is generally turned ON when the stroke of the brake pedal becomes a predetermined value or larger, that is, when the brake pedal is stepped on with a predetermined stroke or larger. When YES at step 310, the routine advances at step 320. When NO, the program exits the subroutine and advances to step 250. At step 320, whether the braking assist is executed or not is determined.

At step 320, it is also possible to determine whether the conditions of starting the execution of the braking assist are satisfied or not. The braking assist is executed by an actuator shown in FIG. 13.

Figure 13:
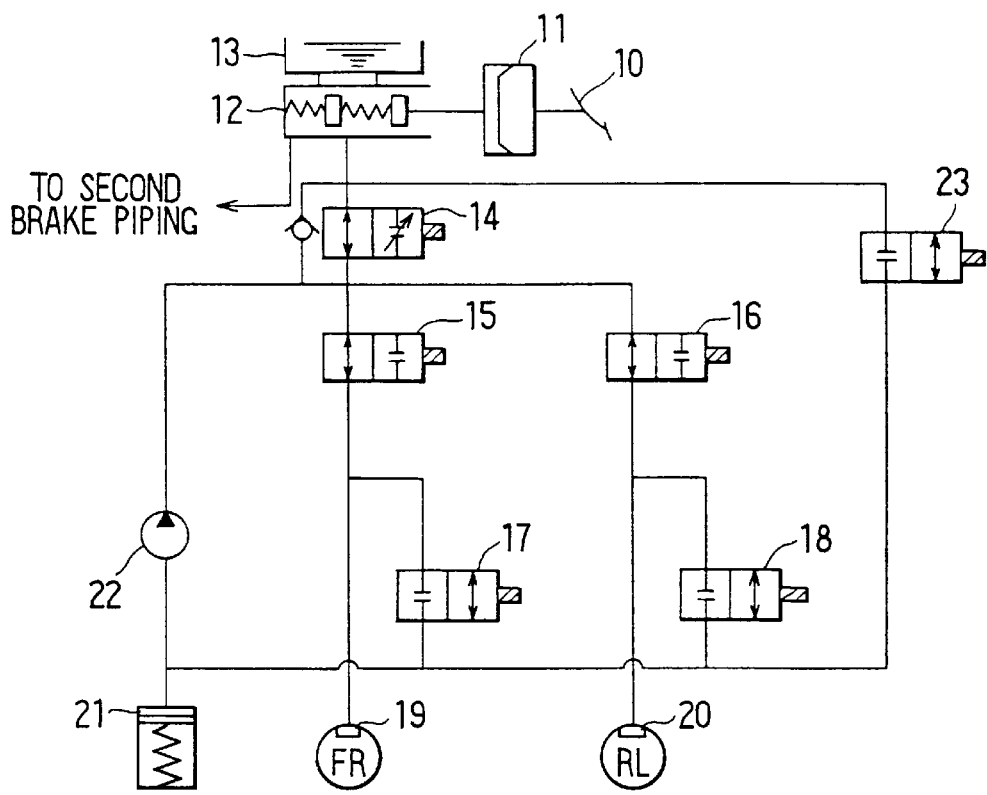
FIG. 13 is a block diagram showing an actuator for performing a braking assist operation.

In brake piping shown in FIG. 13, when a brake pedal 10 is stepped on, a master cylinder pressure is generated in a master cylinder 12 via a brake booster 11 for pressure increasing the stepping force or depression stroke to the brake pedal 10. The master cylinder 12 is provided with a master reservoir 13 from which a brake fluid is supplied into the master cylinder chamber or into which a surplus brake fluid from the master cylinder chamber is reserved. The master cylinder pressure is transmitted via a pipe path constructing a first brake pipe system to a wheel cylinder 19 of the front right wheel FR and a wheel cylinder 20 of the rear left wheel RL.

The system of the brake pipe takes the form of an X pipe. In the second brake pipe system, a brake pipe connecting the front left wheel FL and the rear right wheel RR is provided in a manner similar to the first brake pipe system.

Between the master cylinder 12 and the wheel cylinders 19 and 20, a differential pressure control valve 14, a first pressure increasing control valve 15, and a second pressure increasing control valve 16 are provided. The first and second pressure increasing control valves 15 and 16 are valves for increasing and holding the wheel cylinder pressure when an anti-skid control is executed. In a pressure decreasing pipe path extended from a part between each pressure increasing control valve and each wheel cylinder and connected to a reservoir 32, a first pressure decreasing control valve 17 and a second pressure decreasing control valve 18 for controlling pressure decreasing of the wheel cylinder pressure at the time of the anti-skid control are provided.

The differential pressure control valve 14 is provided on the master cylinder 12 side with respect to a branch point of the pipe paths extending from the master cylinder 12 to the wheel cylinders 19 and 20 and adopts a linear control valve structure having two ports of the differential pressure positions which can vary the path flow from a narrowed state to a closed state by a communication position and an electromagnetic force. In a pipe path extended from a some midpoint between the differential pressure control valve 14 and the master cylinder 12 and connected to the suction side of a pump 22, a suction valve 23 is provided.

In the brake system having such a construction, the valves are in the positions as shown in FIG. 13 at the time of normal brakes in which the braking assist and the anti-skid control are not performed. The braking assist is executed by the pump 22, the differential pressure control valve 14, and the suction valve 23. More specifically, the pump 22 is driven simultaneously with the start of the braking assist, the suction valve 23 is positioned in the communication position, and the brake fluid is sucked from the master cylinder 12. The differential pressure control valve 14 is changed from the communication position to the differential pressure position to hold the pressure difference between the master cylinder 12 side and the wheel cylinder side in the narrowed state or the closed state. Consequently, the brake fluid pressure higher than the master cylinder pressure can be applied to the wheel cylinders 19 and 20.

The braking assist start conditions are as follows. The depression speed of the brake pedal by the driver is equal to or higher than a reference speed, the deceleration of the vehicle is equal to or larger than a reference value, the brake pedal stroke or the master cylinder pressure is equal to or larger than a reference value, and the like. That is, it is sufficient to combine conditions by which a hard braking operation or a panic braking operation can be detected and to make determination.

Figure 14:
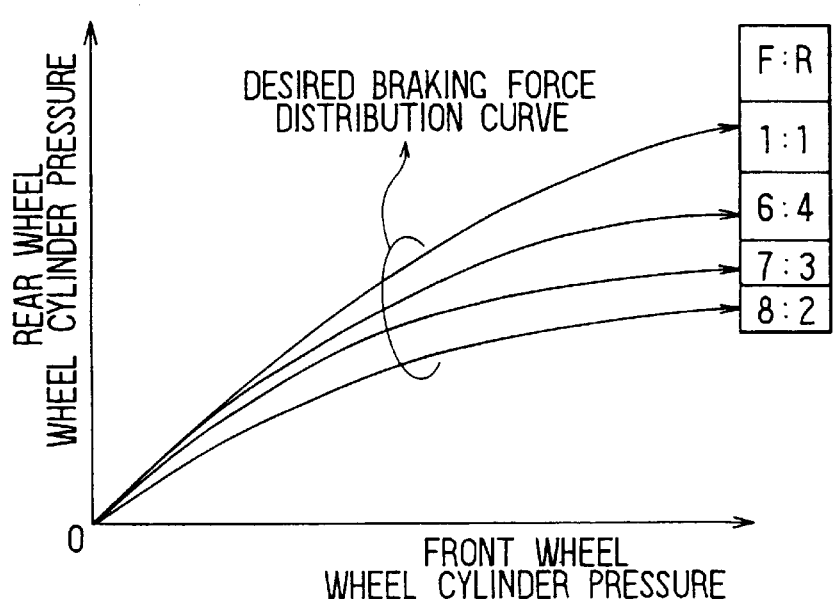
FIG. 14 is a graph showing a front and rear braking force distribution which is set according to loads of respective wheels.

When YES at step 320 in FIG. 11, the routine advances to step 330 where the ratio of the front and rear braking forces is calculated. The distribution ratio of the front and rear braking forces is calculated according to the front and rear wheel load ratio obtained at step 300. That is, when it is assumed that the ratio of the front wheel load to the rear wheel load is 7 to 3, the braking force distribution ratio of the front wheel to the rear wheel, namely, the ratio between the wheel cylinder pressure applied to the wheel cylinder on the front wheel side and that applied to the wheel cylinder on the rear wheel side is set to 7 to 3. The front and rear braking force distribution ratio can be also set based on a desired braking force distribution curve of the front and rear wheel cylinder pressures as shown in FIG. 14 and the map of the front and rear load ratio.

Based on the braking force distribution ratio of the front and rear wheels which is set as mentioned above, the actuators are driven at step 340. As the actuators, it is sufficient to use the first and second pressure increasing control valves 15 and 16 shown in FIG. 13. That is, a pressure higher than the master cylinder pressure obtained by the sucking and discharging of the pump 22 and holding the brake fluid pressure on the wheel cylinder side by the differential pressure control valve 14 is distributed by a duty drive of the pressure increasing control valves. The pressure decreasing control valves can be combinedly used.

As described above, a value corresponding to the wheel load of each wheel or the ground contact load is estimated at step 230, the front and rear wheel load ratio is calculated at step 300, and a front and rear braking force ratio is set based on the front and rear wheel load ratio and the actuators are driven. Consequently, an accurate brake fluid pressure adapted to the desired front and rear braking force distribution ratio which changes according to each wheel load ratio can be applied to each wheel cylinder, and the braking distance is accordingly shortened. The desired front and rear braking force distribution ratio is a distribution ratio at which the front and rear wheels are simultaneously locked when the maximum braking force is applied to the front and rear wheels. The brake can be applied while the vehicle body is most stabilized until the wheels are locked. Consequently, when the front and rear braking force distribution ratio is obtained based on the front and rear wheel loads and brakes are applied, the stability of the vehicle body can be optimally ensured.

The wheel cylinder pressure can be also controlled at the front and rear braking force distribution ratio or the right and left braking force distribution ratio by using only the pressure increasing control valves and the pressure decreasing control valves in the brake system shown in FIG. 13. In this case, the pressure reduced braking force distribution for distributing the braking force at a pressure decreased to be lower than the master cylinder pressure is executed. In case of performing the decreased braking force distribution as well, the stability of the vehicle body can be sufficiently ensured.

Figure 15:
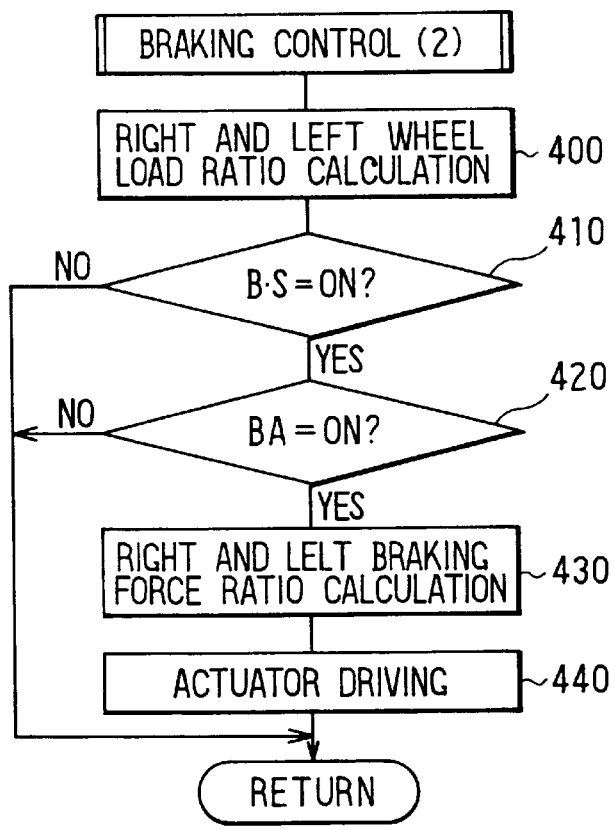
FIG. 15 is a flow diagram showing a second example of the braking control.

(2) FIG. 15 shows a second example of the braking control at step 240. The braking control will be explained based on the flow diagram shown in FIG. 15.

At step 400, based on each wheel load or the value corresponding to the ground contact load obtained at step 230, the ratio of the loads of the right and left wheels in the vehicle body is calculated. The right and left wheel load ratio is derived from the average value of the loads of the front and rear wheels on the right side and the average value of the loads of the front and rear wheels on the left side. The average value may be obtained not by using a value calculated as a true value of the ground contact load of each wheel but by obtaining a ratio between an average value of front and rear values on the right side and that on the left side corresponding to the above wheel loads. The right and left wheel load ratio is varied by the seating position of the passengers, the loading position of a load or a load shift caused by turning of the vehicle.

At steps 410 and 420, determination similar to that at steps 310 and 320 in FIG. 11 is made. At step 430, the right and left braking force distribution ratio is calculated based on the right and left wheel load ratio obtained at step 400. As a method of the operation, it is sufficient to adopt a method similar to the operation of the front and rear braking force distribution ratio at step 330. At step 440, the actuator is driven by a duty ratio control according to the right and left braking force distribution ratio.

As mentioned above, when the right and left braking force distribution ratio is set according to the right and left wheel loads and the brake fluid pressure which is made higher than the master cylinder pressure by the braking assist is distributed to the right and left wheel cylinders, a large braking force is provided on the wheel side having a heavy load and an appropriate braking force can be maximally displayed on the wheel side having a light load. Thus, both of shortening of the braking distance and the vehicle body stability can be realized.

Figure 16:
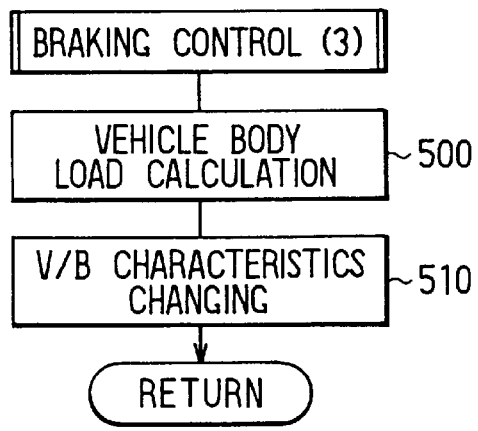
FIG. 16 is a flow diagram showing a third example of the braking control.

(3) FIG. 16 shows a third example of the braking control at step 240 and the braking control will be explained based on the flow diagram.

First, at step 500, the vehicle body load is obtained based on wheel loads of the wheels obtained at step 230. For example, the vehicle body load may be also estimated according to the average value of the true values of the wheel loads. In the vehicle body load as well, the state where there are no passenger and no load is set to a predetermined value (for instance, 1), and the ratio between the predetermined value of this state and the average of values corresponding to the ground contact loads of the wheels is obtained, thereby enabling a vehicle body load fluctuation ratio to be obtained.

Figure 18:
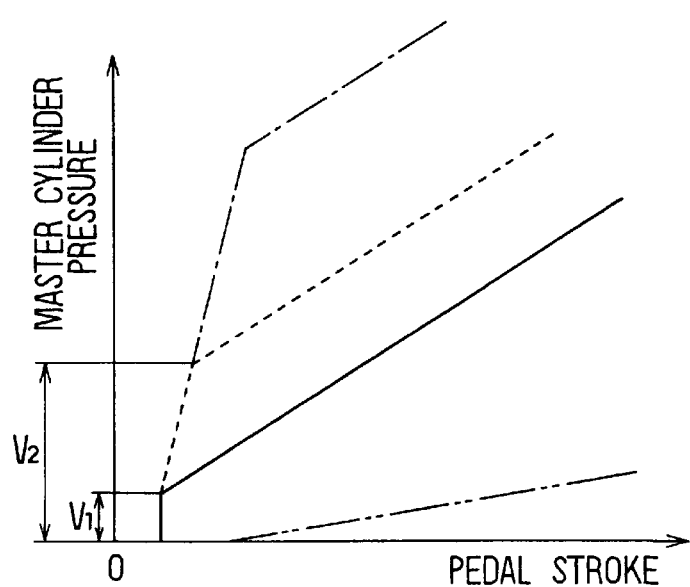
FIG. 18 is a characteristics graph showing an example when the pressure increasing characteristics of a brake booster is varied.

At step 510, the pressure increasing characteristics of the brake booster 11 is varied according to the vehicle body load. It is sufficient to vary the pressure increasing characteristics of the brake booster 11 by using the construction as shown in FIG. 18. The construction shown in FIG. 18 can be combinedly used in place of the brake booster in the brake system of FIG. 13.

A brake booster 110 in FIG. 17 will be described. The brake booster 110 is provided with a vacuum chamber 110A into which an intake manifold vacuum is introduced and an atmospheric pressure chamber 110B into which the atmospheric pressure is introduced. The atmospheric pressure chamber 110B and the vacuum chamber 110A are communicated with each other via a mechanical valve 51 in an ordinary state where the brake pedal 110 is not stepped on and both of the vacuum chamber 110A and the atmospheric pressure chamber 110B have a negative pressure. A valve 50 for introducing the atmospheric pressure is in a closed position when the brake pedal 10 is not stepped on. The valve 51 mechanically changes its position to the closed position in accordance with the depression of the brake pedal 10 and the valve 50 also mechanically changes its position to a communication position, thereby introducing the atmospheric pressure into the atmospheric pressure chamber 110B. The vacuum chamber 110A is in a vacuum state and the rod of the pedal is energized to the left side in the figure by the pressure difference created by the atmospheric pressure introduced into the atmospheric pressure chamber 110B. The characteristics of the pressure increasing operation by the energization is shown by a solid line in FIG. 18. A two-dot chain line in FIG. 18 shows the characteristics of the pedal stroke and the master cylinder pressure when the pressure increasing operation by the brake booster 110 does not exist.

Figure 17:
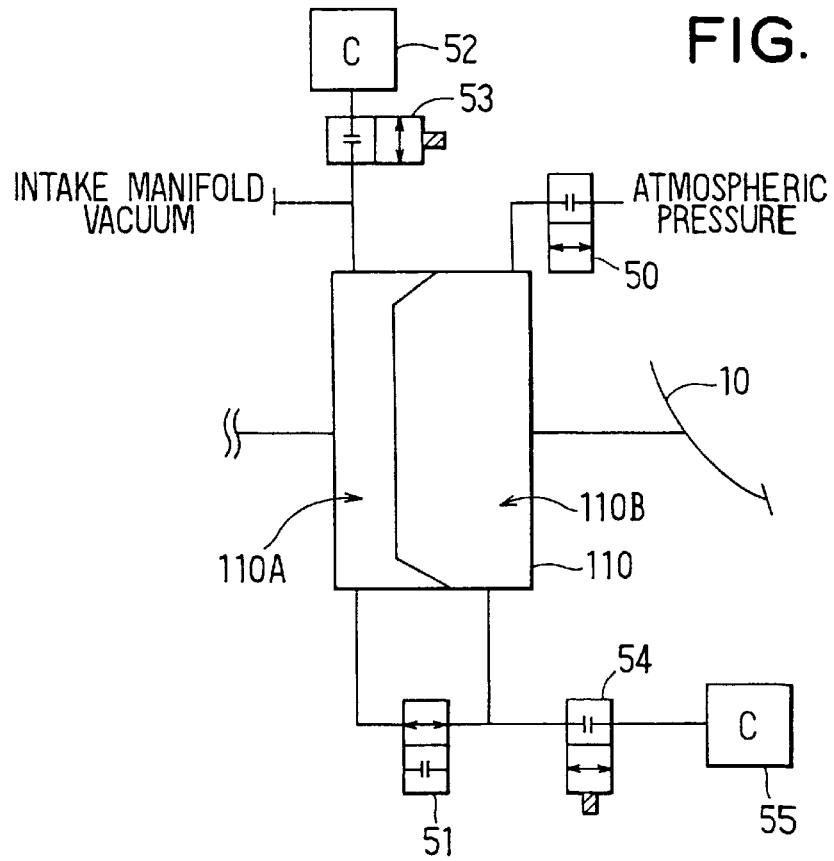
FIG. 17 is a block diagram of an actuator for performing the third example of the braking control.

In FIG. 17, in addition to the intake manifold vacuum, a vacuum is generated by a first compressor 52 and the vacuum lower than the intake manifold vacuum is created in the vacuum chamber 110A via an electromagnetic valve 53. Consequently, when the vacuum in the vacuum chamber 110A becomes lower, the difference between the vacuum and the atmospheric pressure becomes larger and a larger pressure increasing operation can be produced as shown by a dotted line in FIG. 18.

Further, in FIG. 17, air is injected from a second compressor 55 for introducing a pressure higher than the atmospheric pressure via an electromagnetic valve 54 into the atmospheric pressure chamber 110B. Consequently, the pressure in the atmospheric pressure chamber 110B becomes higher than the atmospheric pressure and the pressure difference between the vacuum chamber 110A and the atmospheric pressure chamber 110B becomes larger, so that the pressure increasing operation further increases as shown by a one-dot chain line in FIG. 18.

In a period from zero of the pedal stroke to the rising of the initial master cylinder pressure, as shown in FIG. 18, a jumping characteristics of a sudden rise exists. When the pressure increasing characteristics of the brake booster is varied, in addition to increase or decrease of the pressure increasing operation, it is also effective to increase the jumping operation from V1 to V2 in FIG. 18. To vary the jumping operation, for example, it is sufficient to set not only the mechanical valve 50 but also the electromagnetic valve 54 into the communication state from the beginning of the depression of the brake pedal. V1 in FIG. 18 shows a rising state of the master cylinder pressure in the early time of the depression of the brake pedal 10 in the ordinary brake booster characteristics. V2 shows a rising state of the master cylinder pressure in the early time of the depression of the brake pedal when the pressure increasing characteristics of the brake booster shown by the dotted line in which the pressure increasing operation and the jumping characteristics are increased is realized.

A control of increasing the pressure increasing operation of the brake booster 110 is executed as the vehicle body load calculated at step 500 becomes higher. The value (V2) of the jumping characteristics may be increased as the vehicle body load becomes higher.

In this manner, the braking characteristics according to the vehicle body load can be realized. That is, when the vehicle body load is large, that is, when the vehicle weight is heavy, the braking distance becomes longer as compared with the case where the vehicle body load is small even when a predetermined brake fluid pressure is applied to the wheel cylinder. When the pressure increasing characteristics of the brake booster is changed in accordance with the simply detected vehicle body load by the tire spring resonance without adding any special construction, however, a predetermined braking power can be ensured irrespective of the vehicle body load.

Figure 19:
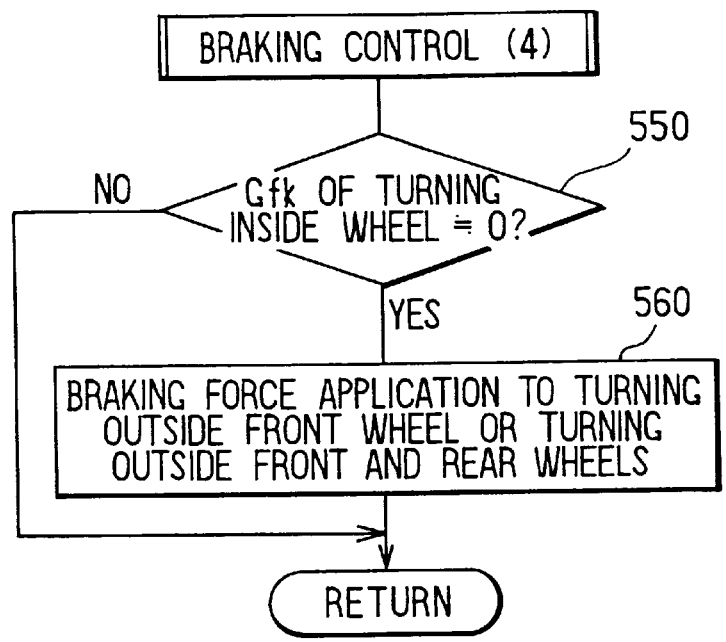
FIG. 19 is a block diagram of an actuator for performing a fourth example of the braking control.

(4) FIG. 19 shows a flow diagram of a fourth example of the braking control at step 240.

In the example, a case of executing a control to prevent a vehicle from being turned over on its side when the vehicle makes a turn will be described.

For instance, a case in which the vehicle is turned over on its side when the vehicle turns left is assumed. Such a turn-over occurs when a large reactive force from the road surface is applied to the right front wheel, a large side force occurs, and the left rear wheel rises. In this state, no load is applied to the rear left wheel (load=0), a heavy load is applied to the front right wheel.

In this case, if the large reactive force from the road surface applied to the front right wheel can be reduced, the side force caused by the road surface reactive force applied to the front right wheel can be reduced. Consequently, when the front right wheel is made in a slip state by increasing the braking power of the front right wheel or both the front and rear right wheels, the side force in the front right wheel is decreased so that the fulcrum disappear. Thus, the turn-over of the vehicle can be prevented. The control will be described hereinbelow based on FIG. 19.

First, at step 550, whether the load applied to the rear wheel which is an inside wheel at the time of a turning is around zero or not is determined. That is, when the load is around zero, there is the possibility that the vehicle is turned over on its side. The state where the load is around zero denotes that the power spectrum Gfk of a wheel becomes almost zero. In this state, therefore, regardless of the road surface condition such as asphalt road or dirt road, when the power spectrum Gfk becomes around zero, it can be determined that the load of the wheel is around zero irrespective of the value corresponding to the load of each wheel or the true value of the load. It can be also estimated from the ground contact load ratio of the wheels that the ground contact load of which wheel becomes around zero. For example, at the braking time upon left turn, there can be a case where the results such that the ratio of the front right wheel is 1, the ratio of the front left wheel is 0.5, the ratio of the rear right wheel is 0.8, and the ratio of the rear left wheel is 0.1 are obtained. In this case, since it can be estimated that a load is hardly applied to the rear left wheel, the load on the rear left wheel can be estimated to be around zero. For example, when the load ratio is estimated only in a predetermined road surface state such as the asphalt road, the maximum load applied on one wheel can be preliminarily estimated. When the ratio of the wheel is reduced to, for example, 0.1 or 0.2 or lower, the actual load of the wheel can be estimated. In matching of every kind of a vehicle, therefore, it can be set so that a wheel having the ratio of a predetermined value or lower in the load ratio of each wheel is determined to have a wheel load of around zero.

At step 560, a braking force is applied on the front wheel which is an outside wheel at the time of the turn or the both wheels which are outside wheels at the time of the turn.

As mentioned above, when the load applied on the rear wheel which is the inside wheel at the time of the turn is around zero, by applying braking force on the front wheel which is an outside wheel at the time of the turn or both wheels which are outside wheels at the time of the turn, the vehicle can be prevented from being turned over on its side.

In this case, when the braking operation by the driver is not performed, a brake fluid pressure is applied to the outside wheel at the time of a turn as described above. When the braking is applied, at step 560, it is sufficient to increase the brake fluid pressure in order to increase the braking force in the front wheel which is an outside wheel at the time of the turn or both wheels which are outside wheels at the time of the turn. The application amount or the increase amount of the brake fluid pressure can be adjusted to be increased or decreased in accordance with the speed of the vehicle at that time and/or the turning radius.

[Driving force control (step 250)]

Figure 20:
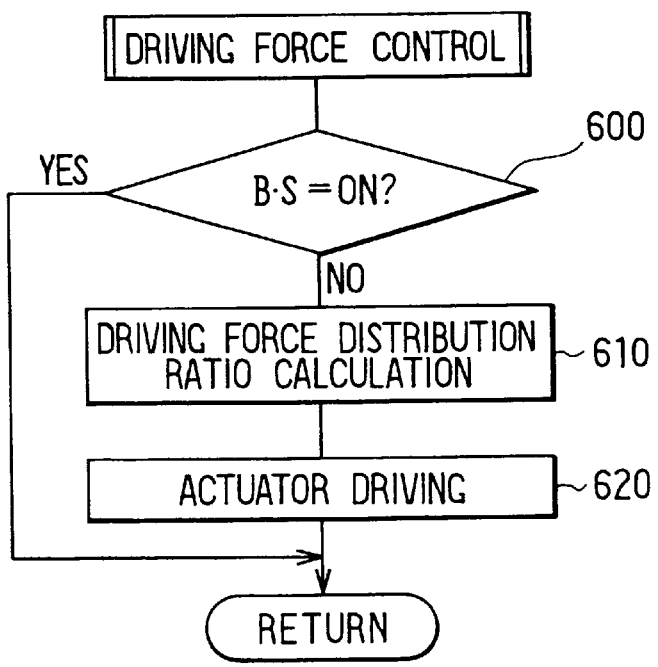
FIG. 20 is a flow diagram showing a driving force control.

The driving force control will be described with reference to the flow diagram of FIG. 20.

Figure 21:
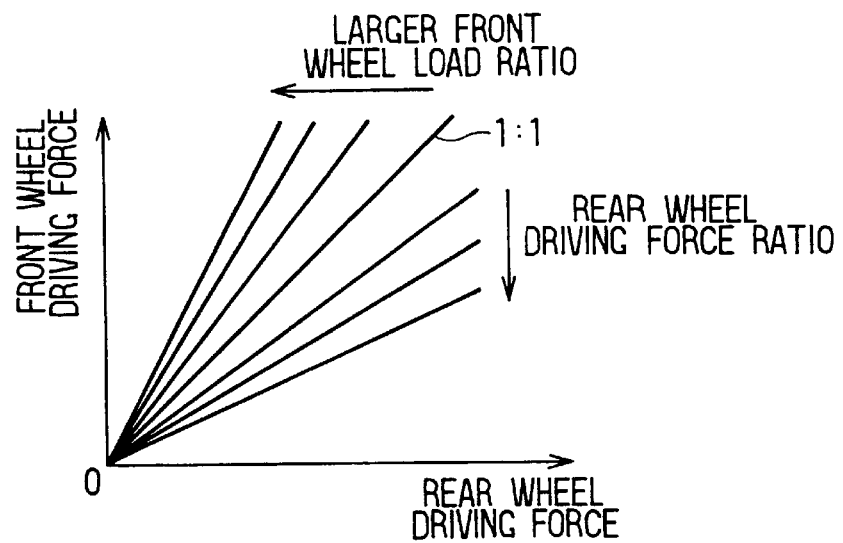
FIG. 21 is a map which is used to set a distribution ratio of front and rear driving forces in accordance with the load ratio of the front and rear wheels.
Figure 22:
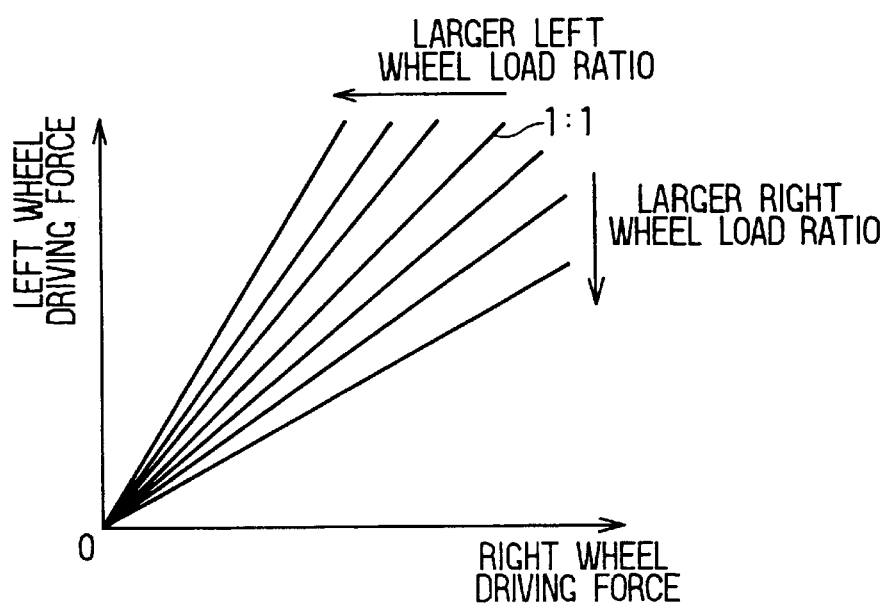
FIG. 22 is a map which is used to set a distribution ratio of right and left driving forces in accordance with the right and left wheel load ratio.

The driving force control is executed in the following manner. At step 600, the depression of the brake pedal is detected by checking whether a brake switch is ON or not. When the brake pedal is not stepped on and it is determined that brakes are not substantially applied to the vehicle body by the brake fluid pressure, the routine advances to step 610 where a driving force distribution ratio among the wheels is calculated. That is, the driving force control is carried out mainly to avoid a slip state caused by acceleration. With respect to the driving force distribution ratio among the wheels, in a four wheel drive vehicle, the front and rear wheel driving force ratio and the right and left wheel driving force ratio are set based on maps shown in FIGS. 21 and 22. In a front wheel drive vehicle or a rear wheel drive vehicle, the right and left wheel driving force ratio is set based on the map of FIG. 22. As shown in FIG. 21, when the load ratio of the front wheel side is larger in the load ratio of the front and rear wheels, the front wheel driving force is set to be larger than the rear wheel driving force. On the contrary, when the load ratio on the rear wheel side is larger, the rear wheel driving force is set to be larger than the front wheel driving force. As shown in FIG. 22, when the average load ratio of the left wheels is larger than that of the right wheels, the driving force of the left side wheels is set to be larger than that of the left side wheels. On the contrary, when the average load ratio of the right side wheels is larger than that of the left side wheels, the driving force of the right side wheels is set to be larger than that of the left side wheels. The driving force can be set not only by the front/rear and right/left load ratios but also in accordance with the absolute value of an average of the front wheel loads and the absolute value of an average of the rear wheel loads. The driving force can be also set in accordance with the absolute value of an average of loads of the left side wheels and the absolute value of an average of loads of the right side wheels.

Figure 23:
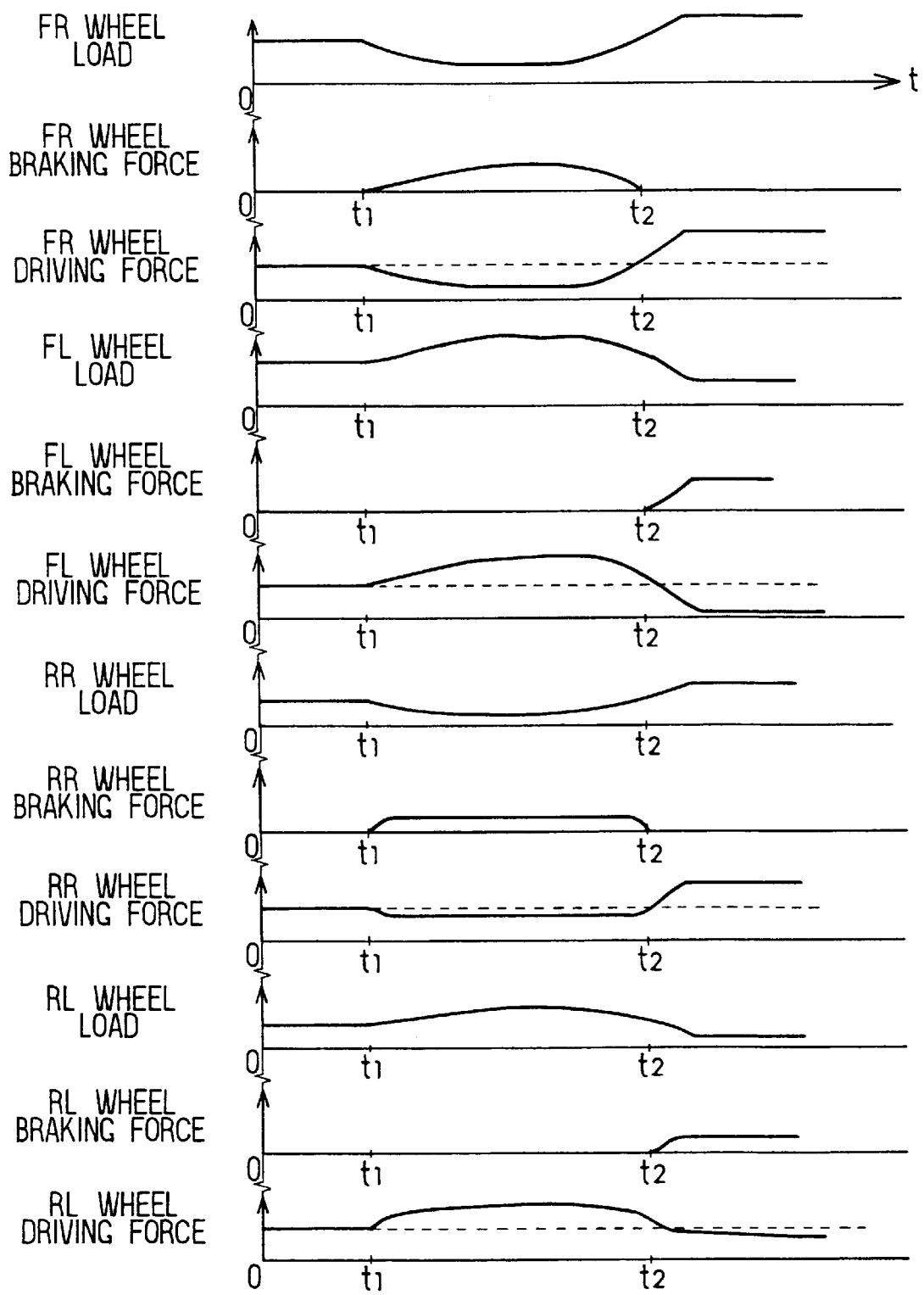
FIG. 23 is a timing diagram showing changes in the loads of the wheels, braking forces, and driving forces of the wheels when the driving force control is performed.

For the actuator driving at step 620 in the driving force control, a driving force control by the brake operation or a driving force control by a torque converter and an LSD (limited Split differential) can be adopted. As an example, the driving force control by using the brake operation will be described. In the construction of FIG. 13, the differential pressure control valve 14 is set in the closed position, the suction valve 23 is set in the communication position, the brake fluid is sucked from the master cylinder 12 and the master reservoir 13 by the pump 22, and the brake fluid pressure is applied to a wheel having a small ground contact load. For example, when it is assumed that the ground contact load of the front right wheel FR (and rear left wheel RL) is small and the ground contact load of the rear left wheel RL (and the rear right wheel RR) is large, the second pressure increasing control valve 16 is held in the communication position, the first pressure increasing control valve 15 is driven by a duty ratio control, and the brake fluid pressure is applied to the wheel cylinder 19. Consequently, the driving force of the front right wheel FR on which the brake operation is applied is transferred to the rear left wheel RL via a front differential, so that the driving force transmitted to the rear left wheel RL is increased. By increasing the driving force to the wheel having a large wheel load, the driving force, namely, the accelerating force of the vehicle is increased. By decreasing the driving force of a wheel having a low ground contact load, slipping of the wheel can be suppressed. FIG. 23 shows an example of the operation of the driving force control. In FIG. 23, an example of the ground contact loads of the respective wheels when the vehicle turns right and then turns left is shown. When the right turn is started at time t1 and the left turn is started at time t2, in a period from time t1 to time t2, brakes are applied to the front right wheel FR and the rear right wheel RR on which the wheel load decreases, and the driving force is moved to the front left wheel FL and the rear left wheel RL. After time t2, brakes are applied to the front left wheel FL and the rear left wheel RL, and the driving force is moved to the front right wheel FR and the rear right wheel RR.

In case of performing the driving force control by the torque converter and LSD, the determination of the brake switch at step 600 can be omitted.

[Acceleration control (step 260)]

The acceleration control will be described with reference to the flow diagram of FIG. 24.

Figure 25:
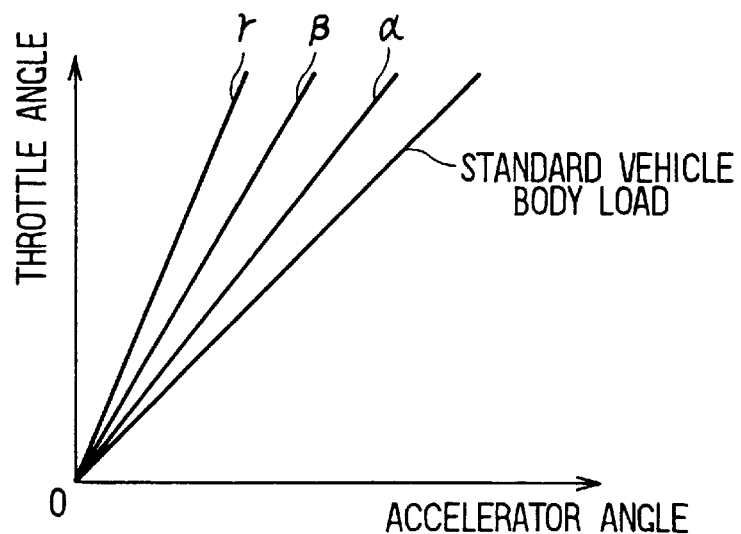
FIG. 25 is a map which is used to set a throttle opening angle corresponding to an accelerator position in accordance with a vehicle body load.

At step 700, in a manner similar to step 500, the vehicle body load is calculated. At step 710, accelerator operation angle by the driver is calculated. The acceleration operation angle can be also sensed by using a sensor for sensing the present accelerator pedal stroke. At step 720, the throttle angle to be controlled is calculated. The throttle angle is set based on a map shown in FIG. 25. That is, as the vehicle body load increases, the ratio of the throttle angle according to the accelerator operation angle by the driver is increased as $\alpha \to \beta \to \gamma$. In accordance with the throttle angle set as mentioned above, at step 730, the actuator driving is performed. The actuator controls and drives a DC motor and the like which varies the throttle angle.

When the throttle angle according to the accelerator pedal operation is varied in accordance with the vehicle body load, even in the case where the vehicle becomes heavy by a load or the number of passengers, in a manner similar to an ordinary light loaded state, by stepping on the accelerator pedal, similar acceleration performance can be obtained.

[Power steering control (step 270)]

The power steering control will now be described based on the flow of FIG. 26. At step 800, in a manner similar to step 500, the vehicle body load is calculated. At step 810, the actuator driving is performed based on the vehicle body load. In the actuator driving, the power steering torque is controlled based on a map shown in FIG. 27. That is, as the vehicle body load becomes heavier, an auxiliary torque by the power steering is increased and the steering operation by the driver is largely assisted. Both of an electric power steering and a hydraulic power steering can be applied. For example, in the hydraulic power steering, an oil pressure to assist the steering operation of the driver is increased according to the vehicle body load.

By performing the power steering control as described above, even if the vehicle body load becomes heavier, burden on the steering operation by the driver hardly changes.

(Second Embodiment)

Although the load of each wheel is estimated by performing FFT to fluctuation in the tire rotation in the first embodiment, in the second embodiment, the load of each wheel is estimated by a linear prediction method. Since the braking control, acceleration control, steering control, and the like executed after the load estimation are similar to those in the first embodiment, the description is omitted here.

The method of estimating the load of each wheel in the embodiment will be described hereinbelow based on the equations (2) to (4).

$$\begin{pmatrix} c1 \\ c2 \end{pmatrix} = \qquad (2)$$

$$-\begin{pmatrix} \sum_{k=1}^{N} y^2(k-1) & \sum_{k=1}^{N} y(k-1)y(k-2) \\ \sum_{k=1}^{N} y(k-1)y(k-2) & \sum_{k=1}^{N} y^2(k-1) \end{pmatrix} \times \begin{pmatrix} \sum_{k=1}^{N} y(k)(k-1) \\ \sum_{k=1}^{N} y(k)(k-2) \end{pmatrix}$$

$$fk = \frac{1}{2\pi T} \cdot \sqrt{\left(\frac{\log c2}{2}\right)^2 + \left\{\cos^{-1}\left(-\frac{c1}{2\sqrt{c2}}\right)\right\}^2} \qquad (3)$$

$$Gfk = \left| \frac{1}{1 + c1 \cdot z^{-1} + c2 \cdot z^{-2}} \right| . \qquad (4)$$

$$\left( \sum_{k=1}^{N} y(k)^2 + c1 \sum_{k=1}^{N} y(k-1)y(k) + c2 \sum_{k=1}^{N} y(k-2)y(k) \right)^2$$

where, y(n): speed of each wheel, fk: resonance frequency, Ts: sampling time, c1 and c2: linear prediction coefficients, and $z_{-1}$exp–πj·fk·Ts.

First, as shown by the equation (2), the linear prediction coefficients c1 and c2 are obtained from the speeds of the wheels by approximating the power spectrum which changes according to a frequency to a quadratic curve and mathematically expressing the power spectrum. When there are a plurality of peaks in the power spectrum, the power spectrum can be approximated to a tertiary curve, a quartic curve, or the like. Peaks except for the peak which is required most can be also masked by a filter.

As shown by the equation (3), the resonance frequency (frequency having the peaks of the quadric curve) is obtained from the linear prediction coefficients. The gain of the power spectrum (hereinbelow, referred to as a peak gain) is obtained by the equation (4). The peak gain is expressed as shown by the equation (4).

The peak gain can be obtained by the linear prediction method as described above and the load of each wheel or the load ratio can be estimated based on the obtained peak gain.

(Third Embodiment)

The estimation of the load of each wheel and the load ratio estimation are carried out by using the fluctuation in the rotation of the tires in the first and second embodiments. In the third embodiment, the estimation of the load of each wheel or the load ratio estimation is performed based on a fluctuation in a vibration (hereinbelow, referred to as a "pitch") synchronized with the tire rotation. Since the braking control, acceleration control, steering control, and the like which are performed after the load estimation or the load ratio estimation are similar to those in the first embodiment, the description is omitted here.

A method of estimating the load of each wheel, that is, a method of estimating a load equivalent value in the embodiment will be described hereinbelow based on the equations (5) to (7).

$$dcT(n) = \qquad (5)$$
$$T(n) - T(n-1) \cdot \left( 1 - \frac{1}{m} \cdot \sum_{k=1}^{m} \frac{(T(n-Np \cdot k) - T(n-Np \cdot k - 1))}{T(n-Np \cdot k - 1)} \right)$$

$$dccT(n) = \begin{cases} dcT(n) & \text{where, } dcT(n) > k3 \cdot T(n-k+1) \\ 0 & \text{where, } dcT(n) \le k3 \cdot T(n-k+1) \end{cases} \qquad (6)$$

$$P(n) = \frac{\sum_{k=1}^{Np} dccT(n-k+1)}{\sum_{k=1}^{Np} T(n-k+1)} \qquad (7)$$

where, T(n): pulse width of each wheel (width of 1/x rotation of tire (x is a positive number)), dcT(n) and dccT(n): change amounts in pitch correction pulse width of each wheel, and P(n): pitch fluctuation parameter.

A pitch component (for example, a pulse-shaped signal generated by a rib or the like of a tire) is included in a signal from each wheel speed sensor. The pitch component fluctuates according to the load applied to each wheel and the load applied to each wheel can be estimated based on the fluctuation in the pitch component.

First, as shown by the equation (5), the pitch correction pulse width change amount dcT(n) of each wheel is obtained based on the pulse width of each wheel. When the pitch correction pulse width change amount of each wheel is equal to or smaller than k3·T(n–k+1), however, it can be considered that the fluctuation is not as a change in the pitch component by the load but as noise. Consequently, an amount obtained by eliminating the noise from the change as shown by the equation (6) is used as a true pitch correction pulse width change amount dccT(n) of each wheel.

Based on the pitch correction pulse width change amount dccT(n) of each wheel, a pitch fluctuation parameter as shown by the equation (7) can be obtained. Since the pitch fluctuation parameter is a load equivalent value corresponding to the load applied on each wheel as described above, the load applied on each wheel or the load ratio can be estimated by using the pitch fluctuation parameter.

As described above, the load applied on each wheel can be estimated based on the pitch component of a signal from a wheel speed sensor.

(Other Embodiments)

The invention is not limited to the examples explained in the foregoing embodiments but can be variously modified.

Figure 4:
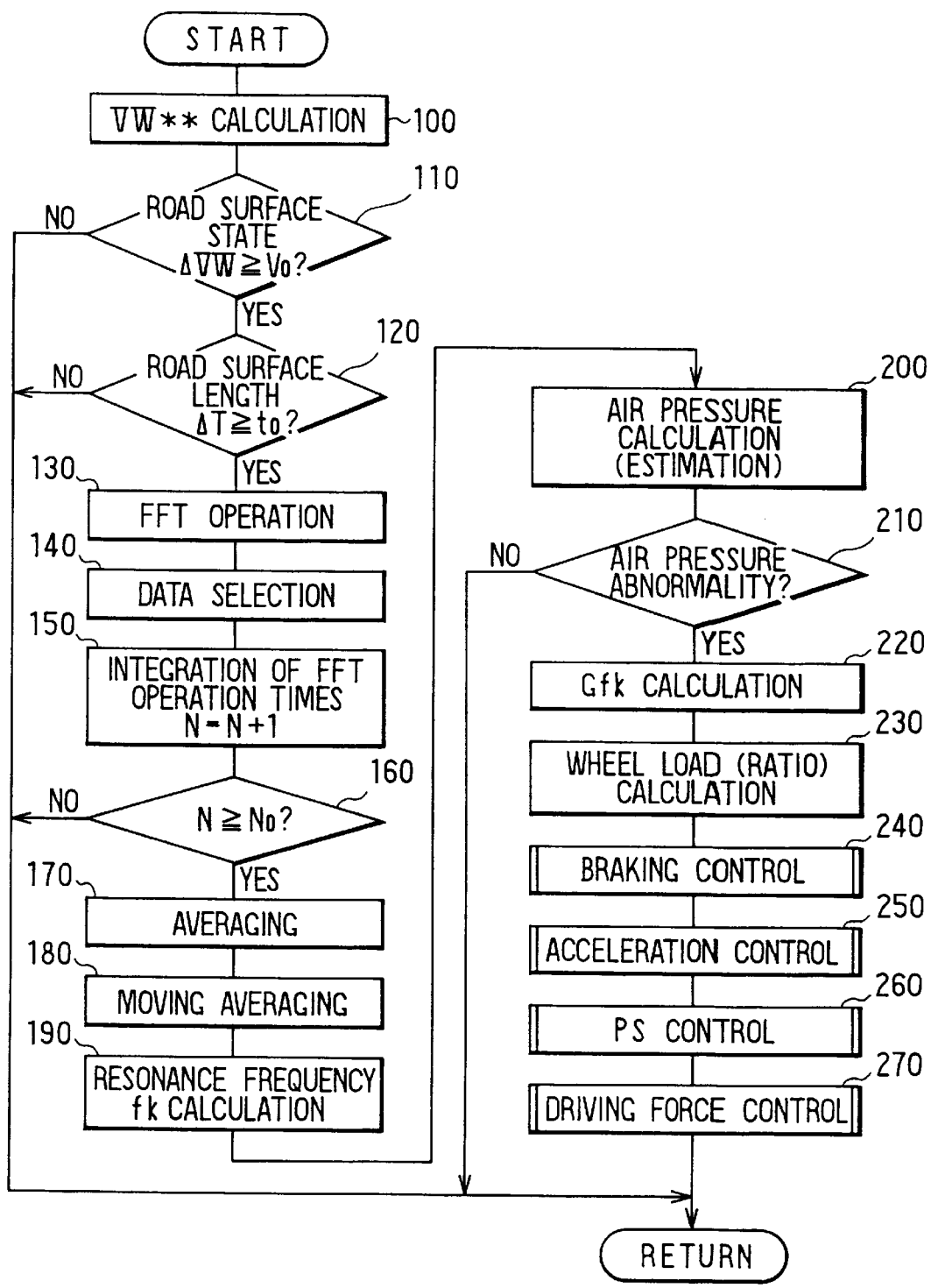
FIG. 4 is a flow diagram showing the main processing of an embodiment of the invention.

(1) For example, although all of the braking control, acceleration control, power steering control, and the like are executed at steps 240 to 270 in FIG. 4, among the steps, only one or a plurality of arbitrary controls may be executed. Although examples of the braking control at step 240 are shown in FIGS. 11, 15, and 16, all of the braking controls can be serially performed. One or a plurality of arbitrary controls can be also executed.

(2) The wheel load of each wheel is calculated based on the power spectrum of the resonance frequency at step 230. The invention is not limited to the calculation. The load ratio of each wheel can be also calculated from the ratio of the magnitude of the power spectrum of each wheel.

(3) In the flow of FIG. 4, in order to improve the operation speed of the processing, the following steps can be added. More specifically, between the steps 230 and 240, as step 231, a static load is obtained based on the wheel load of each wheel or the load ratio of each wheel. The static load is obtained when the vehicle travels straight ahead. To be more specific, load movements (changes) according to the number of passengers, the passenger position, a load capacity, a load position, and the like are obtained. As step 232, a lateral acceleration and an acceleration in the front/rear direction when the vehicle travels are obtained. The lateral acceleration and the acceleration in the front/rear direction can be obtained by adopting accelerator sensors or can be calculated based on outputs of a wheel speed sensor or a steering angle sensor. As step 232, a dynamic load is calculated. The dynamic load is calculated so as to correct the static load calculated at step 231. Specifically, by correcting the wheel load which varies according to braking, turning, turning and braking, and acceleration of a vehicle from the static load based on the lateral acceleration and the acceleration in the front/rear direction, thereby computing a dynamic load. The controls of step 240 and subsequent steps are performed according to the dynamic load. It is sufficient to obtain the vehicle body load by the static load. As mentioned above, when the static load is obtained and the dynamic load is derived as a result of the correction of the static load, the arithmetic operation amount can be reduced and the control can be precisely executed.

(4) At steps 320 and 420 in FIGS. 11 and 15, whether the braking assist is executed or the executing conditions are satisfied is determined. After the positive determination is made, the front/rear or right/left braking force distribution is performed. The steps 320 and 420 may be omitted. More specifically, in a state where the brake switch is ON when the brake pedal is substantially stepped on even slightly, the pump 22 in FIG. 13 is held continuously to be ON, the differential pressure control valve 14 is set in a differential pressure position, and the suction valve 23 is set in the communicating state. In this case, at step 330 or 430, the front/rear and right/left braking force ratio is always calculated in a state where the brake pedal is stepped on, and the brake fluid pressure according to the front/rear wheel load ratio and the right/left wheel load ratio is always applied to the wheel cylinder.

(5) In FIG. 11 or 15, examples of the braking control for controlling the brake fluid pressures applied to the front and rear wheels and the right and left wheels at the front/rear wheel load ratio and the right/left wheel load ratio are shown. The invention is not limited to the examples. The following manner may be also employed. In a four wheel vehicle, the load ratio of each of the four wheels is calculated at step 300. At step 330, the ratio of the braking force applied to each wheel is calculated in accordance with the load ratio of each of the four wheels. At step 340, the brake fluid pressure is applied to each wheel cylinder in accordance with a braking force ratio obtained for each wheel. For example, when the braking is being applied during right turn, the highest brake fluid pressure is applied to the wheel cylinder of the front left wheel FL which is under the highest load, the second highest brake fluid pressure is applied to the wheel cylinder of the rear left wheel RL under the second highest load, the third highest brake fluid pressure is applied to the wheel cylinder of the front right wheel FR under the third highest load, and the lowest brake fluid pressure is applied to the wheel cylinder of the rear right wheel RR under the lightest load. In such a manner, the controls covering the flows of FIGS. 11 and 15 can be realized.

(6) When the jumping characteristics is varied in the characteristics change of the pressure increasing operation of the brake booster at step 510 in FIG. 16, instead of changing the jumping characteristics by the brake booster, the jumping characteristics can be changed by the pump 22 and the differential pressure control valve 14 in FIG. 13. More specifically, simultaneously with the depression of the brake pedal, the pump 22 is driven to make the differential pressure control valve 14 enter a differential pressure state, and V2 indicative of the rising characteristics of the master cylinder pressure in FIG. 18 may be realized by suction and discharge of the pump from the master cylinder. In accordance with the differential pressure state in the differential pressure control valve 14, that is, a pressure holding ratio by the pipe regulating degree, the magnitude of V2 in the jumping characteristics can be varied.

Figure 24:
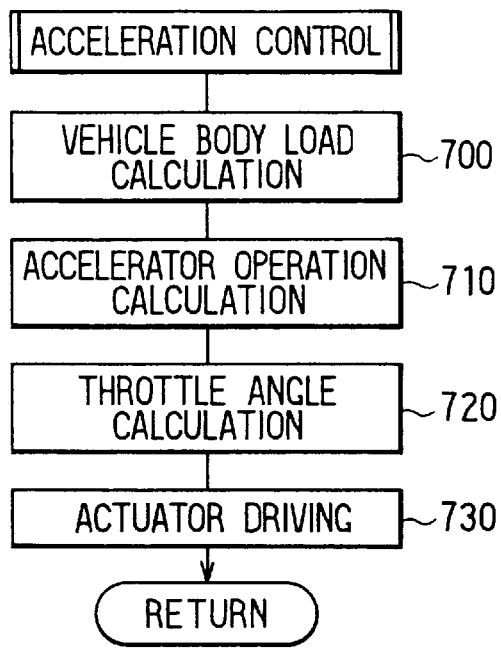
FIG. 24 is a flow diagram showing an acceleration control.

(7) In the acceleration control shown in FIG. 24, the throttle angle according to the accelerator operation amount is set based on the vehicle body load. The invention is not limited to the control but the acceleration control can be also executed at the ground contact load ratio of each wheel.

For example, the acceleration control is performed in accordance with the front and rear wheel load ratio for each of a front wheel drive vehicle and a rear wheel drive vehicle.

First, the case of the front wheel drive vehicle will be described. When the average or sum of the wheel loads of the right and left front wheels is larger than the average or sum of the wheel loads of the right and left rear wheels, the wheel load on the front wheel side is increased by a shift of the center of gravity to the front part of the vehicle (mainly, depending on the position of the passengers and the position of a load), thereby increasing the gripping force between the right and left front wheels and the contacting road surface. When an output equivalent to an engine output according to the accelerator pedal operation in the case where there is no increase in the gripping force, namely, no shift of the center of gravity is produced when there is the shift of the center of gravity in the forward direction, by the increase in the grip force, a propulsion force decreases. Consequently, when the wheel load on the front wheel side is large, the throttle angle is corrected so as to increase the engine output corresponding to the accelerator pedal operation amount. On the contrary, when the wheel load on the rear right/left wheel side is larger, the throttle angle is corrected so as to decrease the engine output corresponding to the accelerator pedal operation amount. In such a manner, the propulsion force characteristics can be made constant according to the loads on the front and rear wheels in association with the shift of the center of gravity in the front/rear direction of the vehicle body.

Second, the case of the rear wheel drive vehicle will be described. The operation with respect to the rear wheel drive vehicle is opposite to that of the front wheel drive vehicle. That is, when the wheel load on the front right/left wheel side is larger than that on the rear right/left wheel side, the engine output corresponding to the accelerator pedal operation amount is decreased. When the wheel load on the front right/left wheel side is smaller than that of the rear right/left wheel side, the throttle angle is corrected so as to increase the engine output corresponding to the accelerator pedal operation amount.

Figure 26:
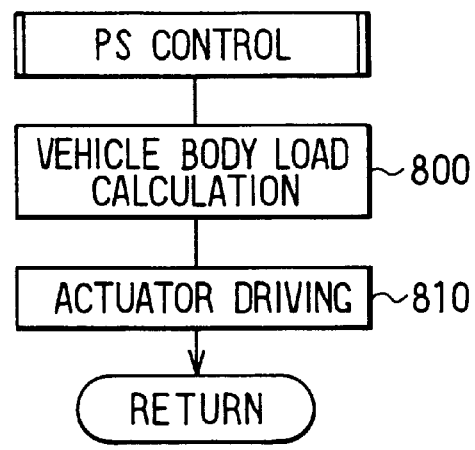
FIG. 26 is a flow diagram showing a power steering control.
Figure 27:
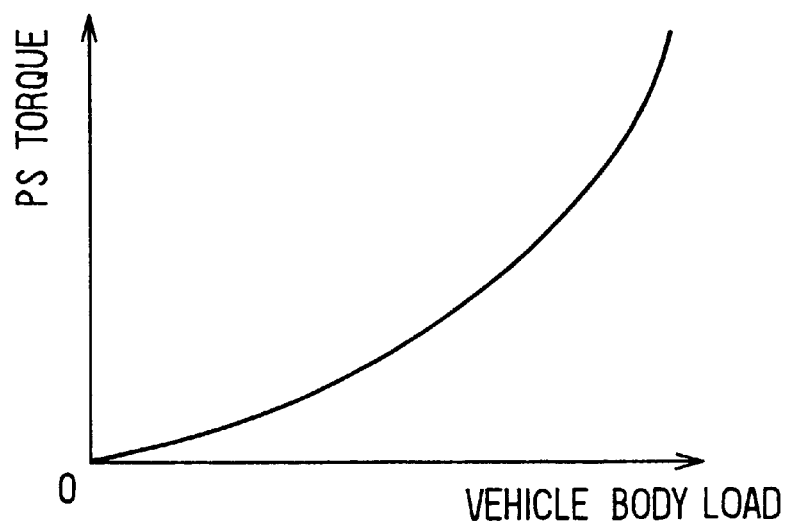
FIG. 27 is a map showing a setting characteristics of a power steering torque corresponding to the vehicle body load.

(8) In the power steering control shown in FIG. 26 as well, a control based on the load ratio of each wheel can be executed.

For example, with respect to the front/rear wheel ground contact load ratio, when the ground contact load on the front wheel side is larger than that on the rear wheel side, in association with the increase in the grip power due to the heavy ground contact load on the right and left front wheels, the power required to rotate the wheels increases. The assist force of the power steering may be accordingly increased. When the center of gravity is shifted to the rear wheel side, the grip force of the front wheels is reduced. Consequently, the assist force of the power steering may be small. In accordance with the front/rear wheel load ratio, therefore, the assist force of the power steering may be corrected so as to increase or decrease. Consequently, even if the center of gravity of the vehicle body is shifted, an equivalent power steering characteristics can be always obtained, so that the riding comfort of the passengers is improved. The power steering control and the acceleration control based on the front/rear wheel load ratio can be also performed not based on the front/rear wheel load ratio but according to increase or decrease in the values of the right and left front wheel loads or increase or decrease in the values of the right and left rear wheel loads.

In the foregoing first embodiment, the resonance frequency is calculated and the load of each wheel is estimated based on the power spectrum of the resonance frequency or the power spectrum is used as a value corresponding to the load of each wheel to estimate the wheel load ratio. When only the gain of each wheel is known, however, the gain itself is used as a value indicative of the load or a value corresponding to the load, the ratio can be obtained without extracting the resonance frequency. For example, in the LPC method, only a resonance gain can be obtained without acquiring the resonance frequency itself.

The present invention may be implemented in other various ways without departing from the spirit of the invention.

What is claimed is:

1. A control apparatus for a vehicle, comprising:
   resonance frequency detecting means for detecting each of resonance frequencies generated in tires of a plurality of wheels when a vehicle travels;
   gain detecting means for detecting a gain of the resonance frequency of each tire, which is detected by the resonance frequency detecting means; and
   vehicle body load estimating means for estimating a vehicle body load of the vehicle based on the gain of the resonance frequency extracted from each of the tires by the gain detecting means.

2. A control apparatus for a vehicle, comprising:
   wheel speed detecting means for detecting a wheel speed of each of a plurality of wheels when a vehicle travels;
   resonance frequency detecting means for detecting a resonance frequency generated in a tire of each of the wheels based on a wheel speed signal corresponding to each wheel detected by the wheel speed detecting means;
   gain detecting means for detecting a gain of the resonance frequency of each tire detected by the resonance frequency detecting means;
   wheel ground contact load estimating means for estimating a ground contact load of each wheel based on the gain of the resonance frequency of each tire detected by the gain detecting means; and
   vehicle body load estimating means for estimating a vehicle body load based on the ground contact load of each wheel estimated by the wheel ground contact load estimating means.

3. A control apparatus for a vehicle according to claim 1 or 2, further comprising:
   control means for varying a braking characteristics of the vehicle based on the vehicle body load estimated by the vehicle body load estimating means.

4. A control apparatus for a vehicle according to claim 1 or 2, further comprising:
   control means for varying a throttle angle corresponding to an operation amount of an accelerator pedal operated by a driver based on the vehicle body load estimated by the vehicle body load estimating means.

5. A control apparatus for a vehicle according to claim 1 or 2, further comprising:
   control means for increasing or decreasing an assist power to steering operated by a driver based on the vehicle body load estimated by the vehicle body load estimating means.

6. A control apparatus for a vehicle, comprising:
   wheel speed detecting means for detecting each of wheel speeds of a plurality of wheels when a vehicle travels;
   resonance frequency detecting means for detecting a resonance frequency generated in a tire of each wheel based on a wheel speed signal corresponding to each wheel detected by the wheel speed detecting means;
   gain detecting means for detecting a gain of the resonance frequency of each tire detected by the resonance frequency detecting means;
   wheel ground contact load ratio estimating means for estimating a ground contact load ratio of each wheel based on the gain of each tire detected by the gain detecting means; and
   control means for executing at least one of a braking control, an acceleration control, a power steering control, and a driving force control of a vehicle in accordance with the ground contact load ratio estimated by the wheel ground contact load ratio estimating means.

7. A control apparatus for a vehicle according to claim 6, wherein:
   the wheel ground contact load ratio estimating means estimates a value corresponding to the ground contact load of each wheel based on the gain of each tire detected by the gain detecting means and estimates the ground contact load ratio of each wheel based on the ground contact load of each wheel.

8. A control apparatus for a vehicle, comprising:

wheel speed detecting means for detecting each of wheel speeds of a plurality of wheels when a vehicle travels;

means for detecting a pitch as a vibration synchronized with rotation of each wheel based on a wheel speed signal corresponding to each wheel detected by the wheel speed detecting means;

gain detecting means for detecting a gain of a fluctuation in the pitch;

wheel ground contact load ratio estimating means for estimating a ground contact load ratio of each wheel based on the gain of each tire detected by the gain detecting means; and control means for executing at least one of a braking control, an acceleration control, a power steering control, and a driving force control of a vehicle in accordance with the ground contact load ratio of each wheel estimated by the wheel ground contact load ratio estimating means.

9. A control apparatus for a vehicle, comprising:

wheel speed detecting means for detecting each of wheel speeds of a plurality of wheels when a vehicle travels;

resonance frequency detecting means for detecting a resonance frequency generated in a tire of each wheel based on a wheel speed signal corresponding to each wheel detected by the wheel speed detecting means;

gain detecting means for detecting a gain of the resonance frequency of each tire detected by the resonance frequency detecting means;

wheel ground contact load equivalent value calculating means for calculating an equivalent value which is equivalent to a ground contact load of each wheel based on the gain of each tire detected by the gain detecting means;

ground contact load ratio estimating means for estimating a ground contact load ratio of wheels in accordance with the ground contact load equivalent value of the wheel; and control means for executing at least one of a braking control, an acceleration control, a power steering control, and a driving force control of a vehicle in accordance with the ground contact load ratio of each wheel estimated by the wheel ground contact load ratio estimating means.

10. A control apparatus for a vehicle according to claim 9, wherein:

the resonance frequency detecting means includes means for detecting a vibration frequency of the tire and means for detecting a linear coefficient by approximating the vibration frequency to a multiple order curve, and detects the resonance frequency from the linear coefficient; and the gain detecting means detects the gain of the resonance frequency based on the linear coefficient.

11. A control apparatus for a vehicle according to claim 10, wherein:

the linear coefficient detecting means has means for masking a region apart from the resonance frequency among a plurality of peaks of a waveform of the vibration frequency, and approximates the vibration frequency to a quadric curve.

12. A control apparatus for a vehicle according to any one of claims 7 to 11, wherein:

the wheel ground contact load ratio estimating means includes front and rear load ratio estimating means for obtaining a load ratio on the front side of the vehicle body and a load ratio on the rear side of the vehicle body.

13. A control apparatus for a vehicle according to claim 12, wherein:

the control means distributes a first brake fluid pressure higher than a master cylinder pressure to a wheel cylinder on the front wheel side and a wheel cylinder on the rear wheel side in accordance with a front and rear ground contact load ratio based on the front and rear ground contact load ratio estimated by the wheel ground contact load ratio estimating means.

14. A control apparatus for a vehicle according to any one of claims 7 to 11, wherein:

the wheel ground contact load ratio estimating means includes right and left load ratio estimating means for estimating load ratios on the right and left sides of the vehicle body based on the load equivalent value.

15. A control apparatus for a vehicle according to claim 14, wherein:

the control means distributes, based on the right and left ground contact load ratio estimated by the wheel ground contact load ratio estimating means, the first brake pressure to a wheel cylinder on the left wheel side and a wheel cylinder on the right wheel side in accordance with the right and left ground contact load ratio, at a braking assist time during which a first brake fluid pressure higher than the master cylinder pressure is applied to either the wheel cylinder on the front wheel side or that on the rear wheel side.

16. A control apparatus for a vehicle according to any one of claim 6, wherein:

the control means applies a brake fluid pressure which is increased to a pressure higher than the master cylinder pressure or decreased to a pressure lower than the master cylinder pressure to each wheel cylinder so as to correspond to each wheel ground contact load ratio, based on each wheel ground contact load ratio estimated by the wheel ground contact load ratio estimating means.

17. A control apparatus for a vehicle according to any one of claims 6, further comprising:

control means for controlling a driving force transmitted to each wheel when no brake is applied to the vehicle to a value according to a ground contact load ratio based on the ground contact load ratio of each wheel estimated by the wheel ground contact load ratio estimating means.

18. A control apparatus for a vehicle according to any one of claims 7 to 11, comprising:

control means for increasing or decreasing an assist force to steering operated by the driver based on the ground contact load ratio of each wheel estimated by the wheel ground contact load ratio estimating means.

19. A control apparatus for a vehicle according to claim 12, wherein:

an assist force to steering operated by the driver is increased when the ground contact load on the front wheel side is larger than the ground contact load on the rear wheel side in the ratio of the front wheel load and the rear wheel load estimated by the front and rear wheel load ratio estimating means, and the assist force to the steering is reduced when the ground contact load on the rear wheel side is larger than that on the front wheel side.

20. A control apparatus for a vehicle according to any one of claims 7 to 11, wherein:

the control means varies an engine output of the vehicle corresponding to the accelerator pedal operation based on the ground contact load of each wheel estimated by the wheel ground contact load estimating means.

21. A control apparatus for a vehicle according to claim 20, wherein:

the control means varies the engine output by changing the throttle angle corresponding to the accelerator pedal operation.

22. A control apparatus for a vehicle according to claim 12, wherein:

a front wheel drive vehicle corrects, at the ratio of front and rear wheel loads estimated by the front and rear wheel load ratio estimating means, to increase the throttle angle corresponding to the accelerator pedal operation when the ground contact load on the front wheel side is larger than that on the rear wheel side, and to decrease the throttle angle corresponding to the accelerator pedal operation when the ground contact load on the rear wheel side is larger than that on the front wheel side.

23. A control apparatus for a vehicle according to claim 12, wherein:

a rear wheel drive vehicle corrects, at the ratio of the front and rear wheel load ratio estimated by the front and rear wheel load ratio estimating means, to decrease the throttle angle corresponding to the accelerator pedal operation when the ground contact load on the front wheel side is larger than that on the rear wheel side, and to increase the throttle angle corresponding to the accelerator pedal operation when the ground contact load on the rear wheel side is larger than that on the front wheel side.

24. A control apparatus for a vehicle according to any one of claims 2, wherein:

a second brake fluid pressure higher than the master cylinder pressure is generated at, at least the front wheel which is an outside wheel at the time of a turning, when a load of a rear wheel which is an inside wheel at the time of a turning is estimated to be about zero detected by the wheel load estimating means.

25. A control apparatus for a vehicle according to claim 1, wherein:

the vehicle body load estimating means includes travel road surface state estimating means for estimating a state of a road surface on which the vehicle travels, and permits the vehicle body load to be estimated in accordance with the road surface state.

26. A control apparatus for a vehicle, comprising:

gain detecting means for detecting a gain of a resonance frequency generated in a tire of each of a plurality of wheels when a vehicle travels; and vehicle body load estimating means for estimating the vehicle body load of the vehicle based on the gain of the resonance frequency extracted from each of the tires by the gain detecting means.

27. A control apparatus for a vehicle, comprising:

wheel speed detecting means for detecting each of wheel speeds of a plurality of wheels when a vehicle travels;

gain detecting means for detecting a gain of a resonance frequency generated in a tire of each wheel based on a wheel speed signal corresponding to each wheel detected by the wheel speed detecting means;

wheel ground contact load ratio estimating means for estimating a ground contact load ratio of each wheel based on the gain of each tire detected by the gain detecting means; and control means for executing at least one of a braking control, an acceleration control, a power steering control, and a driving force control of a vehicle in accordance with the ground contact load ratio estimated by the wheel ground contact load ratio estimating means.

* * * * *